United States Patent [19]

Azad et al.

[11] Patent Number: 5,462,867
[45] Date of Patent: Oct. 31, 1995

[54] COVALENT ATTACHMENT OF MACROMOLECULES TO POLYSULFONES OR POLYETHERSULFONES MODIFIED TO CONTAIN FUNCTIONALIZABLE CHAIN ENDS

[75] Inventors: A. R. M. Azad, Northborough; Randal A. Goffe, Medway, both of Mass.

[73] Assignee: Hemasure, Inc., Marlborough, Mass.

[21] Appl. No.: 190,732

[22] Filed: Feb. 2, 1994

Related U.S. Application Data

[63] Continuation of Ser. No. 956,432, Oct. 1, 1992, abandoned, which is a continuation of Ser. No. 258,406, Oct. 17, 1988, abandoned.

[51] Int. Cl.$^6$ .................... C12N 11/06; G01N 33/549; C07K 17/06; C07C 315/00
[52] U.S. Cl. .................... 435/181; 435/180; 436/531; 436/532; 436/824; 530/413; 530/815; 530/816; 568/28
[58] Field of Search .................... 435/180, 181; 436/531, 532; 530/413, 815, 816; 568/28

[56] References Cited

U.S. PATENT DOCUMENTS

| | | | |
|---|---|---|---|
| 3,847,851 | 11/1974 | Tugukuni et al. | 260/22 CB |
| 4,413,074 | 11/1983 | Wrasidlo et al. | 524/43 |
| 4,434,150 | 2/1984 | Azad et al. | 435/7.5 X |
| 4,673,734 | 6/1987 | Tayot et al. | 435/176 X |
| 4,693,985 | 9/1987 | Degen et al. | 435/181 X |
| 4,810,639 | 3/1989 | Pankratz | 435/174 X |
| 4,885,207 | 12/1989 | Johnson et al. | 435/180 X |
| 4,963,494 | 10/1990 | Hibino et al. | 435/181 X |
| 4,973,493 | 11/1990 | Guire | 435/181 X |

OTHER PUBLICATIONS

Hamley, G. G., The Condensed Chemical Dictionary, Van Nostrand Reinhold, Co., 1971, p. 711.
R. E. Kesting, "Chapter 5: Polymer Solutions" in *Synthetic Polymeric Membranes* 2d Ed., 1985, Wiley.

Primary Examiner—David M. Naff
Attorney, Agent, or Firm—Heslin & Rothenberg

[57] ABSTRACT

A hydrophobic polymer such as polysulfone or polyethersulfone is modified to contain an increased number of functionalizable chain ends such as by treating with an alkali hydroxide to provide hydroxyl groups. A linker is covalently bonded to a chain end of the polymer and a macromolecule is covalently bonded to the linker. A ligand may be covalently bonded to the macromolecule. The macromolecule can be a natural polymer, a synthetic polymer or a biologically active species. The hydrophobic polymer is preferably in the form of a microporous membrane. By the use of a four-component dope composition, substantially isotropic microporous structures in the form of flat sheets or hollow fibers are produced. An improved spinnerette assembly is provided for the production of hollow fibers.

76 Claims, 10 Drawing Sheets

0
COVALENT ATTACHMENT OF MACROMOLECULES TO POLYSULFONES OR POLYETHERSULFONES MODIFIED TO CONTAIN FUNCTIONALIZABLE CHAIN ENDS

This application is a continuation of application Ser. No. 07/956,432, filed Oct. 1, 1992, now abandoned, which is a continuation of application Ser. No. 07/258,406, filed Oct. 17, 1988, now abandoned.

INTRODUCTION

The present invention relates to a process for modifying hydrophobic polymer or hydrophobic polymer blend surfaces. In particular, the present invention provides a process for modifying the surface properties of a whole range of hydrophobic synthetic polymers under heterogeneous conditions. By applying the teachings of this invention, the surface properties of articles manufactured from hydrophobic polymers may be modified to suit the articles' end use without adversely affecting their desirable bulk properties. Furthermore, an improved process for manufacturing isotropic microporous membranes is disclosed. This improved process takes advantage of the phase inversion properties of a unique dope composition and an improved spinnerette assembly. The surface modification of hydrophobic polymer surfaces, in general, is readily achieved by the process of the present invention.

BACKGROUND OF THE INVENTION

Synthetic polymers and engineering plastics have long been prominent in the manufacturing industry for their excellent processability and bulk physical properties. Most polymers exhibit desirable physical properties such as thermal and long-term stability, resistance to radiation, wear, abrasion, chemical solvents, and low toxicity. Most polymers also possess good mechanical strength while others demonstrate useful electrical properties. Synthetic materials are in abundance today and are used in all sorts of articles of manufacture from infant bottles and liners to automobile bodies and mechanical parts.

Depending on the end use, however, most engineering polymers exhibit undesirable properties at the polymer surface or interface. Specifically, the surfaces of articles manufactured from the great majority of synthetic engineering plastics are hydrophobic, non-wettable, of low biocompatibility, and they exhibit unacceptable nonspecific protein binding characteristics. Consequently, research workers in the polymer art have sought ways of modifying the surface properties and characteristics of synthetic materials to better suit their anticipated application. This effort has been particularly keen in the biocompatible polymer and membrane art where the surface properties of the membrane are extremely important in determining the usefulness and efficiency of a particular filtration, dialysis, separation, or purification process.

PREVIOUS METHODS FOR THE MODIFICATION OF POLYMER OR MEMBRANE SURFACES

A classical method in use by many workers for modifying or derivatizing polymer surfaces involves the introduction of a co-monomer bearing desirable functional groups to the monomer precursor of the primary hydrophobic engineering polymer. This method necessarily results in a copolymer whose backbone is substantially different from the homopolymer and frequently provides a material with less than optimum performance characteristics. This technique is illustrated by the work of Gregor et al. (*J. Applied Polymer Sci.* 1985, 30, 1113–1132; U.S. Pat. No. 4,705,753).

A more basic approach uses a physical blend of polymers, one of which is the so-called "functional" polymer whose desirable properties and pendant functional groups will hopefully be manifest at the bulk polymer interface or, in the case where the polymer has been made into an article of manufacture (e.g., a membrane), at that article's surface. This technique, besides invariably producing a different material, performance-wise, also suffers from limitations involving the physical compatibility of the two types of polymers. Few pairs of polymers are sufficiently compatible to be blended successfully. In this respect, even the molecular weight distribution of one of the components may play a critical role. Even after a suitable pair has been found, the distribution of the functional polymer component over the polymer surface is hard to predict or control. Moreover, such blends are susceptible to phase separation resulting in the removal of the functional component over the course of ordinary use. A number of issued patents describe a variety of blending techniques (See, for example, U.S. Pat. No. 3,629,170, assigned to Uniroyal; U.S. Pat. No. 3,781,381, assigned to Union Carbide; and U.S. Pat. No. 4,387,187, assigned to ICI). A variation involving an additional crosslinking step is discussed in U.S. Pat. No. 4,596,858 issued to Gregor and an article by Gryte et al. published in the *J. Applied Polymer Sci.* 1979, 23, 2611–2625.

Another method seeks to graft a second polymer onto the surface of the engineering polymer (i.e., on the surface of the manufactured article). Such a method requires polymerizing the monomer precursor of the second polymer and then irradiating the engineering polymer surface with gamma, electron beam, or ultraviolet radiation. British Patent No. 801,479, for instance, describes a method in which a coating material is applied onto a structural surface which is then exposed to charged particle radiation to initiate bonding between the two materials. A variation of this process is outlined in another United Kingdom Patent (No. 839,483) in which the bulk polymer is first subjected to ionizing radiation to activate the structural surface and then treated with a dissimilar organic coating material. Such radiation treatment can penetrate the materials to a significant depth and is detrimental to their structural integrity. High energy radiation can precipitate polymer degradation and chain scission.

Yet another alternative is the so-called "composite" or multilayer approach. The strategy behind this basic approach seeks to preserve the bulk properties of the membrane or other article of manufacture and its primary polymer component while introducing the desired interfacial or surface characteristics via a modifying agent which is "layered" onto the material's surface. The means for such a "layering" are varied but not at all straightforward. In practice, the composite approach, although potentially the most attractive, is characterized by a tenuous, weak link at the surface of the bulk polymer and the modifying agent. This instability is particularly apparent where the two materials are simply held together by adsorptive forces. For example, U.S. Pat. Nos. 4,413,074 and 4,432,875, both to Wrasidlo et al., describe a procedure whereby a modifying agent in the form of a surfactant or a cellulose derivative is baked onto a membrane surface in the presence of a perfluorocarbon surfactant. The interaction is weak and the coating can be washed away with an appropriate solvent. Another example of an adsorptive coating is described in European Application 0 221 046 to Henis et al. Although this reference claims that the surface modification is "irreversible" it is, in fact, stable only under conditions which are similar to the initial surface treatment.

A purportedly stronger binding can be achieved by polymerizing a monomer over the bulk polymer surface and then crosslinking the resulting second polymer in situ. This method is described in U.S. Pat. No. 4,618,533 issued to Steuck. The mechanical separation of the two layers remains a possibility, however. In a very drastic method, U.S. Pat. No. 4,340,482 describes a process in which the chemical grafting of an amino acid onto the surface of a preformed poly(vinylidene difluoride) membrane is purportedly achieved after heating the membrane in a solution of 57% glycine, 23% sodium hydroxide, and 20% water at 120° C. up to an hour and 15 minutes. Details of the chemistry of this process are lacking. Such severe reaction conditions undoubtedly introduces some type of reactive functional group onto the backbone of the hydrophobic polymer. The newly introduced functional group or groups may then combine with the substrate or reagent via an unknown mechanism to provide the "grafted" amino acid moieties. The desirability and utility of exposing manufactured articles to such corrosive conditions, as well as the generality and versatility of the described procedure, is highly questionable. Other known methods suffer from the same general drawback and need for the initial introduction of reactive functional groups to the hydrophobic polymer surface. (See, for example, Manaka and Tomioka, *J. Applied Polymer Sci.* 1965, 9, 3635; Iwakura et al. *J. Polymer Sci.* 1963, C4, 673).

A series of U.S. Pat. Nos. 4,473,474, 4,473,475, and 4,673,504, describes a method for the charge modification of a hydrophilic wettable membrane surface which utilizes crosslinking agents to form a covalent bond with the "hydroxyl, carboxyl, and primary and secondary amines, which are on the hydrophilic microporous membrane and the cationic charge modifying agent." Although these patents state that a covalent bond may form between amino and carboxyl groups on the surface of the preferred nylon 66 (a polyhexamethylene adipamide) membrane and an epoxy group of the crosslinking agent, they fail to disclose the source and origin of these functional groups and seem to suggest that hydroxyl, carboxyl, and amino groups are simply present on all hydrophilic surfaces including the nylon 66. In fact, polyamides cannot contain hydroxyl functional groups. All three patents expressly state that such hydrophilicity is a necessary element of that invention and the most recently issued patent states, again expressly, that hydrophobic polymer membranes are not amenable to charge modification by the methods of that invention. U.S. Pat. Nos. 4,711,793 and 4,708,803 issued to Ostreicher et al. relate to the same subject matter.

U.S. Patents recently issued to Barnes et al. (U.S. Pat. Nos. 4,743,418 and 4,737,291) and European Patent Application 0 066 814 address a process for using 1,4-butanediol diglycidylether, specifically as a crosslinking agent for modifying the charge of a microporous nylon membrane. Again, these references fail to appreciate or teach the origin and nature of the "hydrophilic" functional groups on the membrane surface.

In U.S. Pat. No. 4,693,985, Degen et al. disclose the covalent binding of a macromolecule to the surface of polyamide membranes. Similar to the disclosures of Barnes, supra, the technique is limited to hydrophilic nylons. The preferred membranes comprise undisclosed surface-modifying polymers which are apparently simply adsorbed on the membrane surface, the polyamide polymer itself, and a supporting polymer. The teachings of this patent would perpetuate the prevailing thinking that polyamide polymers are "reactive and functionalizable" while hydrophobic polymers such as polysulfone are simply "inert" and unreactive.

Thus, there remains a need for the covalent derivatization or modification of hydrophobic polymer surfaces, especially the surfaces of articles manufactured therefrom, under relatively mild reaction conditions. Further, it would be most advantageous if such a modification could be performed under heterogeneous conditions in which the hydrophobic polymer material is first manufactured and processed to exploit its desirable engineering properties and then exposed to a treatment which hopes to modify the surface properties of the preformed article without altering its gross structural characteristics.

PRIOR METHODS FOR THE PRODUCTION OF MICROPOROUS MEMBRANES

In the specialized area of membrane art, the current methods for producing microporous membranes generally result in skinned anisotropic structures characterized by wide variations in pore sizes from the outer to the inner portions of the membrane. In particular, the production of isotropic hollow fiber membranes has been hampered by prevailing biases in the art and by existing extrusion methods, over and above the general manufacturing techniques.

In the first place, materials or polymers used for manufacturing membranes have generally been classified, as already stated above, into two general groups: reactive or hydrophilic versus inert (See, for example, Cabasso, I. in "Membranes," *Encyclopedia of Polymer Science and Eng.* 1987, 9, 509–579, by Wiley Interscience Publication; Kesting, R. E., *Synthetic Polymeric Membranes* 1985, 2d Ed., Wiley; Pusch, W. and Walch, A., *Angew. Chem. Int. Ed. Engl.* 1982, 21(9), 660–685). Examples of the former group are either intrinsically hydrophilic or can be readily modified to achieve hydrophilicity. High hydrophilicity minimizes the nonspecific binding of proteins to the polymer surface. The main drawback with intrinsically hydrophilic membranes, especially those made from materials such as cellulose, is their limited mechanical and thermal properties. On the other hand, membranes belonging to the latter "inert" group, while possessing superior physical, thermal and chemical resistance properties, are extremely hydrophobic and are thus prone to nonspecific binding of proteins and membrane fouling or plugging.

As a reactive/hydrophilic membrane material, cellulose has been widely used in many of its forms but has some severe drawbacks. These drawbacks include limited pH and chemical resistance (e.g., to chlorine-containing sanitizing agents) and a general lack of requisite physical properties in many applications (See, Kesting, *Syn. Polym. Memb.*, supra).

Polysulfone (PS) is the most widely used polymer type in ultrafiltration (UF) membranes by virtue of its relative versatility, both in terms of physical/chemical properties and processability to produce a wide variety of structures and pore sizes (i.e., with molecular weight cutoffs, MWc, from about 2,000 kD to about 1 kD). Polysulfones have only become an important polymer for the construction of microfiltration (MF) membranes in recent years. Such MF membranes are becoming more numerous in flat sheet form but are still fairly rare in hollow fiber form. Generally speaking, however, polysulfone membranes tend to foul readily and methods for covalently modifying these membrane surfaces have not been developed. Furthermore, these membranes are invariably of the anisotropic variety.

Traditionally, workers in the art have to take into account the pore size range of interest in selecting the membrane polymer. It is believed that certain polymers are more readily processed to make membranes in certain pore-size ranges than others (See, Kesting, *Syn. Polym. Memb.*, supra). Workers in the field such as Strathmann, et al., *Desalination* 1977, 21, 241–255 and *Desalination* 1975, 16, 179–203; Tanny, et al., *J. Appl. Polym. Sci.* 1974, 18, 2149–2163; Koenhen, D. M., et al., *J. App. Polym. Sci.* 1977, 21, 199–215; Broens, L., et al., *Desalination* 1977, 22, 205–219; Altena, F. W. and Smolders, C. A., *J. Polym. Sci.: Polymer Symposium* 1981, 69, 1–10; Broens, L., et al., *Desalination* 1980, 32, 33–45; Bokhorst, H. et al., *Desalination* 1981, 38, 349–360; Wijmans, J. G., et al., *J. Memb. Sci.* 1983, 14, 263–274; and Kesting have headed efforts toward a greater understanding of the mechanism of membrane formation and the ways of manipulating structural properties. It has generally been accepted in the field of membrane processing that many key manufacturing parameters have to be changed and tediously reoptimized in going from a flat sheet formulation to a hollow fiber product. Progress, has thus been slow, particularly with respect to the production of isotropic microporous hollow fiber membranes.

Others have pursued the use of blends consisting of hydrophilic and hydrophobic polymers as dopes for preparing membranes (See, Cabasso, I. *Encyclopedia of Polymer Science and Eng.*, supra; Pusch, W. and Walch, A., *Angew. Chem. Int. Ed. Engl.*, supra). Their primary goal has been to use hydrophilic polymers as processing aids; i.e., the hydrophilic polymers are used to increase the viscosity of the dope. Extraction steps used to remove the hydrophilic component, during and after the coagulation process, enhances both the pore density and range of pore sizes attainable. Consequently, these references generally avoid very high molecular weight hydrophilic polymers as blend components because these polymers have a greater tendency to be entrapped in the membrane matrix. Furthermore, the membrane technology literature teaches that, as the molecular weight of a hydrophilic additive increases, especially to the 100,000 range and above, the pore size obtained in the final membrane decreases dramatically (See, Cabasso, I. et al., *J. Appl. Polym. Sci.* 1976, 20, 2377–2394; Nguyen, Q. T. et al., *J. Mem Sci.* 1985, 22, 245–255). For example, Cabasso has shown that by increasing the molecular weight (MW) of polyvinylpyrrolidone (PVP) from 10,000 to 40,000 in an experimental PS/PVP blend, the water permeability (Lp) of the resulting hollow fiber is reduced by a factor of five. Furthermore, the initial modulus and tensile strength also suffer. These results suggest that the PVP is retained in the final membrane as the molecular weight is increased. Apparently, the phenomenon of chain entanglement becomes more important as the molecular weight of a water-soluble polymer additive in the blend increases. Thus the high molecular weight additive is less readily extracted and the density of the final membrane increases, preventing the easy passage of water.

A hollow fiber manufacturing process has also been described (See, Cabasso, I. et al., *J. Appl. Polym. Sci.* supra) which employs optically clear (i.e., single phase) dopes made from PS blended with PVP or polyethylene glycol (PEG) (MW=600) dissolved in either dimethylformamide or dimethylacetamide. This reference emphasizes that these dopes do not exhibit any cloud point behavior, not even, the typical upper critical solution temperature (UCST) observed when nonsolvent is titrated into a polymer/solvent mixture. Instead, these clear dopes, when contacted with nonsolvent, become phase separated with the inward diffusion of nonsolvent. Researchers speculate that the size of the resulting solvent/PVP-rich domains are probably dictated by the thermodynamic phase relationships and by the kinetics of the phase separation (See, Cabasso, I. et al., *J. Appl. Polym. Sci.* 1977, 21, 165–180). These observations are essentially consistent with the findings reported by others (See, Kesting, *Syn. Polym. Memb.*, supra; Kamide, K. and Manabe, S., *Material Science of Synthetic Membranes, ACS Symposium Series* 1985, 269 197–228, Lloyd, D. R., Ed.).

Where very high molecular weight hydrophilic polymers (e.g., poly(ethylene oxide) (PEO), at 4 to 5 million MW) have been blended with polysulfone-type polymers, the intent has been to take advantage of the compatibility between the blended polymers and to retain the hydrophilic polymer in a homogeneously blended transparent film (See, U.S. Pat. No. 4,387,187 and EP 37,181 to Newton and assigned to Imperial Chemical Industries, Ltd.). As disclosed in U.S. Pat. No. 4,387,187, such PES/PEO films or semipermeable membranes are prepared mainly by solvent evaporation, with a leaching step to remove remaining solvent from the already formed film. The degree of porosity attained in such a dense membrane is expected to exclude the permeation of molecules much larger than about 1,000 molecular weight. However, due to the retention of PEO in the final structure there would be some hydrophilicity imparted to the membrane.

When using hydrophilic polymers as processing aids the limitation encountered is that of compatibility. In general, low molecular weight polymers can be loaded into dopes at much higher concentrations (See, Japanese Patent No. 57,035,906). This Japanese patent teaches one how to achieve the maximum possible loading of PEG into a homogeneous dope for membrane casting as a function of molecular weight. PEG molecules above 100,000 MW is specifically excluded.

Similarly, Klein and Smith (U.S. Pat. No. 4,051,300) teach the use of low molecular weight PVP (average molecular weight of at least 2,000) in a blend solution with polysulfone to achieve high dope viscosities for hollow fiber manufacture. The weight ratio of polysulfone to PVP is specified to be no less than 0.5 and no greater than 55. Thus, the relatively low molecular weight hydrophilic polymer additive (so-called, "non-solvent" by Klein and Smith) is used in sufficient quantities to serve as a processing aid. The amount of processing aid is restricted to ensure that:

(i) the dope does not exhibit a phase boundary under normal process conditions, e.g., temperature (Cabasso, I. et al., *J. Appl. Polym. Sci.* supra); and (ii) PVP is not retained in the hollow fiber to reduce either the void volume (or rather the porosity) of the final membrane, or the hydraulic permeability (Lp) and pore size.

Membrane forming PS/PVP dopes of Cabasso (Cabasso, I. et al., *J. Appl. Polym. Sci.* supra) and Klein and Smith (U.S. Pat. No. 4,051,300) require contact with a nonsolvent in either the vapor or liquid phase to undergo phase separation. Under these circumstances, the relative rates of diffusion of nonsolvent into the dope and solvent out of the dope control the process of phase separation in these systems. The nonsolvent employed to induce phase separation causes precipitation of the polysulfone while dissolving and extracting the PVP from the polysulfone fiber as it is being formed.

Relying solely on quenching a dope solution with a nonsolvent frequently gives rise to the formation of a skinned highly anisotropic structure due in part to the limitations imposed by inefficient or slow mass transfer. Greater rates of diffusion of nonsolvent molecules through the dope composition may sometimes be achieved by dissolving smaller amounts of solids in the dope. Quenching these low solids dopes in solvent/non-solvent mixtures helps to overcome skin formation and anisotropy. However, the resulting membranes, though more isotropic, are frequently weak and are not self-supporting. This slow diffusion process of the prior art gives smaller pores near the membrane surface which first comes into contact with the nonsolvent and progressively larger pores deeper into the membrane matrix.

In contrast to the nonsolvent induced liquid/solid phase separation for preparing essentially anisotropic microporous membranes, Castro (U.S. Pat. No. 4,247,498) has exploited thermal phase inversion (i.e., liquid/liquid phase separation brought about by temperature changes) in the preparation of isotropic microporous membranes. Thermal phase inversion, as it is currently practiced, requires a polymer melt and a compatible liquid to give a homogeneous solution in which the polymer is solubilized in the poor solvent. Subsequent cooling of these melts results in the precipitation of the polymer. The structure is thus "frozen" by the cooling process.

Different methods for spinning fibers are known in the art. These include dry-wet spinning, in which there exists an air gap between the extrusion device or spinnerette and the quench bath, and wet-jet spinning (See, Cabasso, I. *Encyclopedia of Chem. Tech.* 3rd Edition, Vol. 12, p. 501). In wet-jet spinning the spinnerette is submerged in the quench bath so that there is a zero air gap. When powerful solvents are employed in the quench bath the plasticizing effect on newly formed fiber can limit spinnability.

SPINNERETTE ASSEMBLIES OF THE PRIOR ART

Present spinnerette assemblies for hollow fiber manufacturing, are wholly inadequate and inflexible for the production of substantially isotropic microporous membranes. The extrusion dies currently in use do not provide the degree of control over the pore structure and pore-size distribution of the resulting microporous hollow fibers that one would wish to have. Typical tube-in-orifice spinnerettes are described in U.S. Pat. No. 4,198,363 (Noel, G. et al. ) and U.S. Pat. No. 4,229,154 (Chaban and Hawkins); in Borneman, Z. et al. *Proceedings,* 4th British Oxygen Company Conference, Sept. 1986, p. 145–157; and in Aptel, P. et al. *J. Memb. Sci.* 1985, 22, 199–215. Spinnerette face plate configurations are further disclosed in an article by Cabasso in "Hollow Fiber Membranes," *Encyclopedia of Chem. Tech.,* 3rd Edition, Vol. 12, p. 499, Kirth-Othmer, Eds.

Numerous other spinnerette assemblies or extrusion dies are described elsewhere. Among these are U.S. Pat. No. 4,370,114 (for the production of multi-cored filaments), U.S. Pat. No. 1,541,528 (a device for extruding tubing, not hollow fibers), U.S. Pat. No. 2,574,555 (double-annular face plate but apparently no central hollow bore), and U.S. Pat. No. 3,321,803 (die for coating a metallic pipe). Still other devices are disclosed in U.S. Pat. No. 3,121,254 (mentions inert gas in hollow bore), U.S. Pat. No. 3,357,051 (for extrusion of double-walled tubes), U.S. Pat. No. 3,690,806 (device with internal components useful for reverse-flow and adjustable chock applications), and U.S. Pat. No. 3,716,317 (device for spinning filaments from two polymer streams).

A very recent spinnerette assembly, described in U.S. Pat. No. 4,493,629 (the '629 patent), is a modular unit designed for the co-extrusion of three fluids during hollow fiber manufacture and features a tangental entry port. There are two key factors which make this prior device poorly suited for manufacturing substantially isotropic structures:

(1) The '629 patent describes a spinnerette with only one annulus emerging from the face of the spinnerette (i.e., the surface of the device from which the extruded fiber emerges). Thus, fluids within the body of the device will have a tendency to mix before emerging from the spinnerette as a hollow fiber. The extent of mixing is a function of the relative viscosities and relative flow rates. Therefore, two of the three streams entering the device cannot be varied independent of each other over a significant range of flow.

(2) The plurality of ports in the annular spacer described in FIGS. 4 and 5 of the '629 patent is cumbersome. Moreover, the uniformity of the overall flow, via this divided flow-path, is a direct function of the dimensions of each and every port. Problems arise when delicate control of low, and/or, vastly different flow rates are required. Similarly, difficulties are encountered when there are significant differences in viscosity for the two fluid streams which are forced to emerge through the single annular space.

SUMMARY OF THE INVENTION

The present invention discloses a process for modifying a polymer or structural surface which takes advantage of the functionalizable chain ends of the polymer. The process is carried out under heterogeneous conditions preferably on a polymer which has been preformed into an article of manufacture. Thus, by allowing a covalent bond to form between the functionalizable polymer chain end which is available at the polymer surface and a linker molecule which is capable of serving as a covalent bridge, a ligand or a macromolecule, which is capable of altering the interfacial or surface properties of the polymer, may then be introduced over substantially all the interfacial boundaries of the polymer. The process disclosed is particularly effective for the modification of surfaces of articles manufactured from hydrophobic polymers, although materials made from any polymer with functionalizable chain ends are equally susceptible to modification by the same methods.

The present invention is particularly useful for the surface modification of membranes comprised of hydrophobic polymeric materials. Thus a membrane produced from polyethersulfone, a hydrophobic engineering material with desirable processing characteristics and useful bulk properties but which undesirably binds proteins nonspecifically by adsorption, can be derivatized or modified covalently by utilizing the phenolic end group present in each polymer chain. In those cases where the polymer end groups are less reactive, these chain ends may be converted to more reactive functional groups by a suitable reagent (See, for example, the conversion of terminal chloride groups to terminal hydroxyl groups in FIG. 1). A useful proportion of these groups are exposed at the membrane surface and by bringing the membrane in contact with a solution containing a linker moiety, which linker moiety is capable of forming a covalent bond with the polymer chain end group and at least one functional group of a macromolecular or ligand species, the polymer surface is rendered susceptible to modification by the subsequent introduction of said macromolecule or ligand selected for its ability to alter the surface properties of the bulk polymer. Subsequent layers of a variety of macromolecular or ligand species may then be covalently introduced by repeating the overall process although the use of the linker moiety in these additional layers is not always necessary.

A preferred linker moiety is a diepoxide, an epoxyhalide, or a dihalide and the macromolecule or ligand species may be a hydrophilic or hydrophobic synthetic or natural polymeric substance or may even be a low molecular weight compound. Biologically active proteins, polypetides, and polynucleotides may also be covalently bound to the polymer surface in like fashion.

The present invention also describes the unique characteristics of a four-component dope composition which exhibits thermal phase inversion boundaries at a so-called lower critical solution temperature (LCST) as well as at an upper critical solution temperature (UCST). These properties are exploited by a manufacturing process that employs a temperature-regulated nonsolvent quench bath which serves to initiate the temperature-dependent phase inversion phenomenon as well as freezing or precipitating out and preserving the resultant microporous structure.

In conjunction with the procedure disclosed for the production of anisotropic as well as isotropic microporous flat sheet or hollow fiber membranes, the present invention further describes an improved spinnerette assembly comprised of two independent concentric annuli surrounding a central bore which optionally contains therein a removable hollow pin. This improved spinnerette, which can be maintained at a desired temperature with the aid of means for external heating, is designed to accommodate three separate entry ports for controlling the flow of three separate fluids: namely, a dope composition, an intraannular fluid, and an extraannular fluid. The design of this improved spinnerette is quite simple and economical and has no need for tangental entry ports.

The ability to deliver the extraannular fluid over the outer surface of an extruded hollow fiber permits, among other things, the production of hollow fiber membranes with a substantially isotropic microporous structure in all directions throughout the membrane. As disclosed further below, other membrane structures (e.g., skinned, double-skinned, anisotropic) are also possible by the methods of the present invention.

BRIEF DESCRIPTION OF THE FIGURES

The file of this patent contains at least one drawing executed in color. Copies of this patent with color drawings will be provided by the Patent and Trademark Office upon request and payment of the necessary fee.

FIG. 9 shows magnified images of various parts of the isotropic hollow fiber membranes of the present invention.

DETAILED DESCRIPTION OF THE INVENTION

Figure 1:
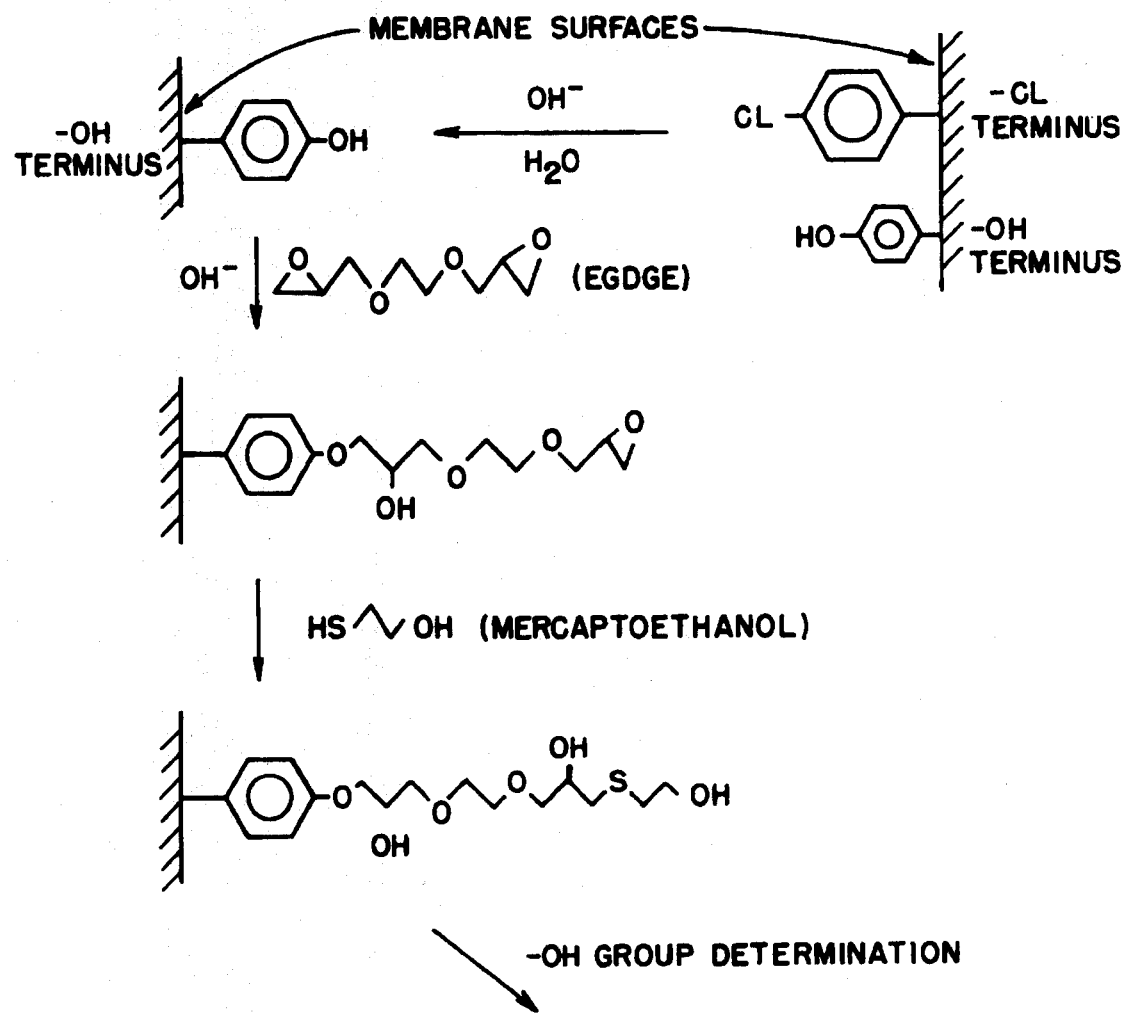
FIG. 1 shows a schematic diagram illustrating the sequence of reactions for derivatizing polymer interfaces.

This invention utilizes the functionalizable chain ends present in practically all polymeric materials. The instant invention provides that treatment of suitable hydrophobic polymer samples, under heterogeneous conditions, with linker moieties capable of forming a covalent bond with the hydrophobic polymer end groups, allows for the modification of the surface properties of the polymer while preserving desirable bulk properties. Using the methods of the invention, the surface properties of any article manufactured from the subject polymer may be modified while preserving the shape and microstructure of the manufactured article. Thus, bulk polymers with functionalizable end groups may be derivatized or modified under heterogeneous conditions whether the polymer is in powdered form, in the form of an extruded fiber, a microporous membrane, a solid strip, molded into a pipe, or incorporated into an artificial organ, skin, or prosthetic device. Such an article may be manufactured by techniques well-known in the art. Examples of these manufacturing methods include but are not limited to, injection, compression, and blow molding, blowing, calendering, casting, coating, forming, lamination, or extrusion methods.

Furthermore, a process for the production of substantially isotropic microporous membranes is disclosed, which process takes advantage of the special properties of a unique four-component dope composition and an improved double annular multi-port spinnerette assembly.

MODIFICATION OF HYDROPHOBIC POLYMER SURFACES

Almost all known polymers have at least one functionalizable end group which is originally present in the monomer precursor or is introduced via the polymerization process. Thus, poly(ethylene oxide) has terminal hydroxyl groups, polyethersulfones have a halide at one end and a substituted phenol at the other, polyimides have terminal carboxyl and amine groups, and polyesters have terminal carboxyl and hydroxyl groups, to name a few polymers. Moreover, polymers prepared by free radical polymerization contain a functionalized initiator fragment at some of the polymer chain ends. For example, a vinyl halide, polymerized in the presence of azobis(isobutyronitrile), would contain a tertiary nitrile group in some of the chain ends. The proportion of polymer chains bearing the initiator fragment may be adjusted by varying the composition of the starting monomer/initiator mixture or the polymerization conditions.

The present invention is directed to the functionalizable groups inherently present at the polymer chain ends. Furthermore, the present invention finds its most significant utility in derivatizing hydrophobic engineering homopolymers, copolymers, or blends having relatively inert monomer units in the polymer backbone. These types of polymers are generally prepared by step, radical chain, ionic chain, ring opening, or Ziegler-Natta polymerization and are generally regarded as being completely inert and not amenable to derivatization or modification by the mild conditions disclosed in this invention. Examples of these polymers include, but are not limited to polysulfones, polyethersulfones, polyimides, poly(arylene oxide), polyarylene sulfide, polyquinoxaline, polysilane, polysiloxane, polyurethanes, poly(etheretherketones), polycarbonates, polyesters, poly(vinyl halides), and poly(vinylidene polyhalides), derivatives, blends, mixtures, or copolymers thereof.

Further, although only one functionalizable end group need be present in a polymer chain, the number of available groups may be increased by chemically converting inherently less reactive or less useful end groups to more useful functionalities. For instance, terminal nitrile groups, introduced by the free radical polymerization using nitrile-containing initiators, may be reduced to amines using any of a wide variety of reducing agents available to the practitioner. Metal hydride reagents can serve this purpose, for example. Aromatic halide groups of polyarylsulfones can be converted to aryloxy groups by treatment with aqueous base. Also, isocyanate groups of polyurethanes may be converted to amines. In this manner, the number of useful terminal groups may be increased without affecting the integrity of the polymer backbone.

In addition, it has also been discovered that preconditioning polymer samples or articles manufactured therefrom by washing or heating the samples in aqueous or nonsolubilizing organic solvents increases the efficiency of the subsequent derivatization steps. Not seeking to be limited by theory, it is believed that the polymer interface or the surface of the manufactured article may be contaminated with foreign materials or processing aids thus shielding the functionalizable end groups. Washing the polymer samples may simply provide a means for mechanically stripping away these contaminants and exposing more of the polymer chain ends present at the surface or interfacial boundaries. Preferred organic solvents include, but are not limited to, acetonitrile and isopropanol. Aqueous solutions of these solvents may also be used.

In one preferred embodiment of the invention, flat sheet microporous membranes, comprising polyethersulfone (PES) as the primary or bulk polymer component, are immersed overnight at room temperature in a basic aqueous solution containing a diepoxide linker moiety. Optionally, the membrane samples may be preconditioned by heating them in aqueous solutions or washing them in acetonitrile or isopropanol. The substituted phenol groups of the PES chain ends exposed at the membrane surface are deprotonated by the base giving a nucleophilic phenoxide group. This nucleophile attacks an epoxide group of the linker moiety forming a covalently bound (i.e., ether bond) linker moiety. Because the covalently bound linker moieties are capable of forming at least one other covalent bond (via e.g., a second epoxide group) with another chemical entity, any molecule, macromolecule, or ligand, may then be covalently bound to the membrane surface. The covalently bound macromolecule is thus held very strongly and cannot be removed by washing or other mechanical means.

It is understood that the linker moiety serves to covalently bridge available functionalizable polymer chain ends with functional groups present on the macromolecule of choice. Thus the linking agent may preferably take the form of any polyfunctional organic molecule such as aliphatic or aromatic compounds bearing epoxide, carbonyl, carboxyl, amino, halo, hydroxyl, sulfonyl halides, acyl halides, isocyanate or combinations of these or other functional groups so long as the linker moiety is stable, compatible, and able to form covalent bonds with the bulk polymer and macromolecular or ligand species. The linker moiety may even incorporate inorganic functionality such as silicon, boron, aluminum, tin, phosphorous, sulfur, or nitrogen groups. It is within the scope of the present invention that other variations incorporating silicates, aluminates, borates, stannates, phosphates, or sulfonates, for instance, may also be used as the primary bridging group. However, ethylene glycol diglycidyl ether (EGDGE), 1,4-butanediol diglycidyl ether, epichlorohydrin, aliphatic dihalides, diacids, diacid halides, disulfonyl halides, and triazines are preferred embodiments of the linker moiety.

As mentioned above, the macromolecular or ligand species selected to modify the membrane surface or, more generally, any hydrophobic polymer surface, should preferably be capable of altering the surface properties of the hydrophobic polymer, membrane, or manufactured article and have at least one functional group which is able to form a covalent bond with the linker moiety. In some cases, one type of functionality may suffice. For example, the —OH groups of hydroxyethylcellulose (HEC) convey hydrophilicity to the hydrophobic membrane surface and also form ether bonds with the pendant epoxide groups of the covalently bound EGDGE. Depending upon the end use applications, therefore, the macromolecule can be comprised of molecules of low molecular weight, oligomers of intermediate molecular weight, or polymeric substances of high molecular weight. Preferably, the macromolecule is of high molecular weight and may include, but is not limited to, surfactants, carbohydrates, lectins, polypeptides, polysaccharides, liposomes, proteins, glycoproteins, olignucleotides, synthetic dyes, natural dyes, polynucleotides, derivatives, or mixtures thereof. Molecules or polymers which are capable of bearing a charge, either cationic or anionic, or those bearing nonionizable groups are also useful. FIG. 1 is a schematic depiction of part of the basic processes of the invention.

Preferred macromolecular species include polysilanes, polysiloxanes, hydroxyalkylcellulose, dextran, carboxymethylcellulose, poly(ethylene imine), poly(carboxymethylethylene imine), poly(vinyl alcohol), derivatives, blends, mixtures or copolymers thereof. The macromolecules may also be biologically important molecules and may include, but are not limited to monoclonal antibodies, polyclonal antibodies, antigenic substances, enzymes, carrier proteins, coagulation factors, cofactors, inhibitors, hormones, immunoglobulins, histones, plasmids, derivatives, or mixtures thereof.

It should be apparent that the process for covalently binding the macromolecule to the polymer chain ends can be repeated several times. Subsequent applications are likely to utilize functionalizable groups of the first macromolecular layer, however, because these groups are present in much greater concentrations than the remaining unutilized polymer chain ends. Each successive binding thus involves increasing numbers of linker moieties resulting in a stronger bond as well as greater amounts of loading on the membrane surface. For this reason, it may sometimes be more advantageous to "amplify" the surface functionalizable groups present on a membrane surface by first applying one or more layers of a readily available macromolecular species before applying a more valuable ligand species on the top layer. In a case where layers of hydrophilic macromolecules are covalently attached, the nonspecific protein binding of the modified surface is lowered dramatically versus the virgin hydrophobic surface.

The covalent binding of the surface ligand layers need not necessarily involve the intermediacy of a linker moiety although in certain cases, a "linker molecule" is best employed. It is possible, for example, to render certain functional groups of macromolecules already bound to the polymer surface more reactive towards the functional groups of an added ligand by employing activating reagents. These methods which lead to active sites on the macromolecule are well known in the art and include the use of such reagents as dialkylcarbodiimides (for forming amide bonds), diazotization (for coupling aromatic groups), cyanogen bromide (most commonly used for the activation of solid supports), epoxides, sulfonyl chlorides, or other processes, such as the use of 2-fluoro-1-methylpyridinium p-toluensulfonate (FMP), which facilitate the coupling reaction by introducing a superior leaving group. Other nonlimiting reagents which may be used to covalently bind the ligand to the macromolecule or polymer surface include diepoxides, haloepoxides, 2,4,6-trichloro-S-triazines, diacid chlorides, dialdehydes, diisocyanates, or haloalkylcarboxylic acids.

Figure 2:
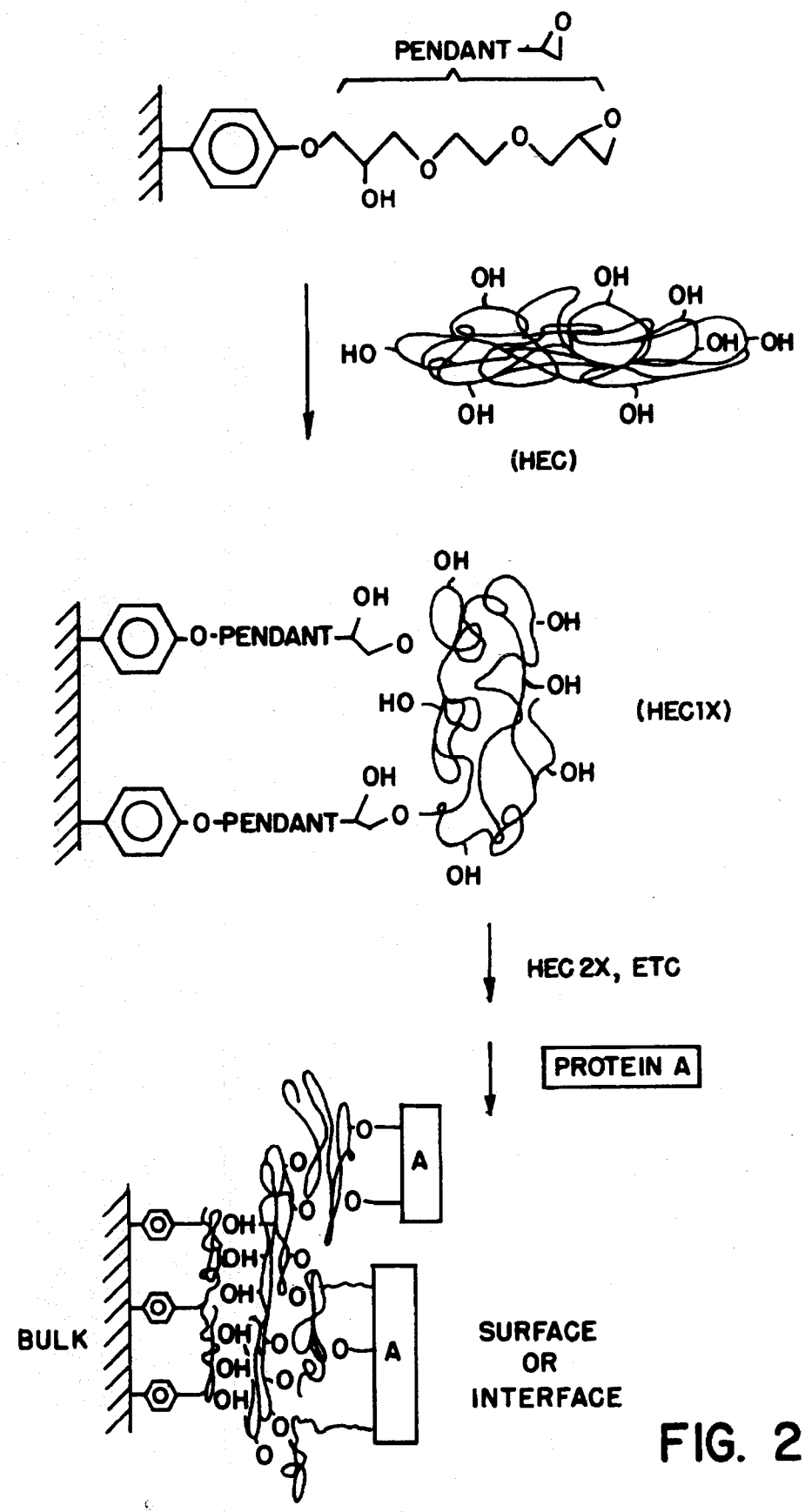
FIG. 2 shows a possible ligand species combination involving hydroxyethylcellulose and Protein A molecules.

In a specific preferred embodiment of the invention, Protein A molecules may be bound directly by using EGDGE as the linker moiety to the polymer chain ends of a hydrophobic PES membrane. Preferably, the PES membrane is first modified by applying a few layers of hydroxyethylcellulose. Other hydroxyl-containing macromolecules such as dextran, agarose, hydroxypropylcellulose, or poly(vinyl alcohol) may be used with equal efficacy. After the number of hydroxyl groups on the membrane surface is thus "amplified," the membrane is treated with FMP to generate active sites on the membrane surface. This sequence of reactions is best illustrated by reference to FIG. 2. The membranes are then exposed to a slightly basic buffered solution of Protein A to effect efficient covalent attachment of this valuable ligand.

Membrane samples with covalently attached Protein A are quite useful, for instance, in the selective binding and isolation of human immunoglobulin G (IgG) from a mixture of serum proteins. This utility is demonstrated in the Examples section of this specification.

It is evident that many types of ligands can be bound to the hydrophobic membrane by the methods of this invention. Natural products and biologically active components as well as synthetic polymeric materials may be used. All the types of molecules listed above as possible macromolecular species, for example, may also comprise the ligand species. Additional non-limiting examples include dyes, enzyme inhibitors, amphoteric, ionizable molecules, hydrophobic long chain aliphatic hydrocarbons, aromatic hydrocarbons, and the like. Silane derivatives may also be useful, not only as simple ligands, but as potential polymerizable species. Examples of these silanes include but are not limited to terminal amino aliphatic hydrocarbon trialkyloxy silanes, such as aminoethyl aminopropyl trimethoxysilane, carboxyl-substituted silanes, long chain aliphatic or aromatic hydrocarbon silanes, and the like. Many types of functional groups may, of course, be present in the silane compounds.

Preferred ligands include natural or recombinant Protein A, Avidin, Biotin, Heparin, animal, plant, bacterial cell surface receptors, antibodies against IgG, IgM, IgA, IgE, tissue plasminogen activator (TPA), human interleukin (IL) proteins, human chorionic gonadotropin (HCG), thyrotropic hormone (TSH), carcinoembryonic antigen (CEA), α-fetoprotein, transforming growth factor (TGF), interferons, and blood coagulation factors such as Factor VIII or IX. In general, ligands capable of binding specific ligates from a sample solution or mixture with a dissociation constant of about $10^{-2}$–$10^{-12}$M are preferred. Those with binding constants less than about $10^{-6}$M are highly preferred. Other preferred ligands and possible substrates or ligates are listed in U.S. Pat. No. 4,693,985. The entire disclosure of this reference is incorporated herein by reference.

Still other examples of useful ligands may be easily found in catalogs for products useful in molecular biology research (See, e.g., ligand index in the Pharmacia Affinity and Chromatography Media catalog incorporated, herein by reference). An abbreviated list is illustrative: acetylglucosamine, anti-A lectin, arginine, butylamine, castor bean lectin, Cibacron Blue, coenzyme A, decylamine, diadenosine pentaphosphate, gelatin, hemoglobin, iminodiacetic acid, HMG-CoA, lysine, NADP, oligo(dA, dC, dG, dI, or dT), PHA-L, polyriboguanylic acid, poly(I)poly(C), Procion Red, uridine nucleotides, or conjugates thereof. The only limitation on the ligand species is that it have at least one functional group with which to form a covalent bond with the linker moiety or the active sites on the macromolecule.

In addition, potentially any article manufactured from a polymer which has functionalizable chain ends may be modified by the process of the invention. In particular, plastic components of artificial organs, tissues, or prosthetic groups may be made into any shape, taking full advantage of the processability and strength of the engineering polymer. These materials may then be made more biocompatible by modifying their surface properties by the process described herein. Of course, the general areas of purification, separation, filtration and, in particular membrane technology are significantly advanced by the present methods.

PROCESS FOR MANUFACTURING SUBSTANTIALLY ISOTROPIC MICROPOROUS MEMBRANES

The process for derivatizing hydrophobic polymer interfaces discussed above is especially applicable to the surface modification of microporous membranes. In the course of devising new ways of preparing membranes, the inventors have discovered a unique four-component dope composition which in combination with other aspects of the overall manufacturing process provides membranes with substantially isotropic microporous structures formed either as flat sheets or, perhaps more significantly, hollow fibers.

DOPE COMPOSITION

This novel dope composition comprises a primary polymer component, a secondary polymer component and two solvents, the first of which is an effective solvent for both polymers (i.e., one in which both polymers readily dissolve), and the second an effective solvent for the secondary polymer component but a nonsolvent for the primary polymer component (i.e., one in which the primary polymer is poorly or sparingly soluble, or, preferably, substantially insoluble). It is the latter solvent component which conveys a certain degree of incompatibility or instability to the resulting dope mixture, and by judiciously adjusting the relative amounts of the various components, the critical parameters, such as the lower and upper critical solution temperatures (LCST and UCST, respectively) which characterize the dope composition, may be optimized to better fit the desired processing steps.

An important feature of this invention is selection of the polymer pair to be employed in the dope. Relatively good compatibility is needed to enable the manipulation of the phase boundary as a function of the nonsolvent content (e.g., glycerin) to the extent desired (See, FIG. 4). Compatibility can be defined very generally in the following way: when two polymers can be co-dissolved in a common solvent (or mixture of solvents) in any ratio at 5–50% total solids to obtain an optically clear solution at a manageable temperature, such a solution is said to be compatible.

As in the case of the PES/PEO (primary/secondary polymer components, respectively) polymer pair, a solvent such as glycerin serves both as a solvent for one polymer while acting as a nonsolvent for the other. The polymer for which this liquid is an effective nonsolvent comprises the major or primary component of the final membrane desired (in this case, PES). The polymer which is soluble in both solvents should also possess hydrophilic character, such as water-soluble polymers, but is not limited to this group. However, one should keep in mind that when a water-soluble polymer is used, higher molecular weight forms are statistically more likely to be retained in the final membrane by chain entanglement than those of lower molecular weight when an aqueous quench is employed in manufacture. This entrapment, in itself, may be desirable because a certain degree of hydrophilicity and wettability is imparted to the otherwise hydrophobic membrane surface.

A broad range of hydrophilic polymer (e.g., PEO) molecular weights are useful in this invention, from molecular weights in the tens of thousands (e.g., PEG) up to millions in molecular weight). The preferred molecular weight for PEO is no less than 100,000.

An important advantage of the PES, polysulfone (PS), and other high glass transition/melt temperature polymers as the main component in these blends, is that their use results in membranes which can be autoclaved repeatedly without detrimentally altering membrane properties. Indeed, autoclaving can, in fact, increase tensile strength of PES/PEO fibers, presumably by enabling polymer relaxation to occur and thereby prevent the slow tightening or densification process observed with solution cast membranes over days, weeks, or even months. Such a densification process often leads to a reduced hydraulic permeability over time. Finally, PES/PEO fibers are sufficiently hydrophilic (by virtue of the presence of some PEO at the surfaces of the membrane) that wet/dry cycling can be done without wetting aids and with no change in performance.

Examples of other suitable polymer pairs which may be utilized in this invention include, but are not limited to: polysulfone (PS)/PEO; PES/Polyvinyl pyrrolidone (PVP) (particularly the high molecular weight forms, e.g., MW about 360,000 of PVP); PS/PVP (MW ~360,000); Polyvinylidene fluoride (PVDF)/PEO; PES/Epichlorohydrin copolymers of PEO; PES/Polyvinyl alcohol (PVA); Polyphenylene oxide (PPO)/Hydrophilized forms of polystyrene (including copolymers and sulfonylated polystyrene); poly(acrylonitrile) (PAN). and copolymers/hydrophilic acrylic polymers (including polyacrylamide), or PVP; PES/hydrophilized forms of PES (including sulfonated PES); and PS/hydrophilized forms of PS.

Suitable solvent/non-solvent pairs are numerous but are preferably within the definition of compatibility and selection of the polymer pair stated previously. Generally speaking, the class of heterocyclic or amine-containing solvents (including tetrahydrofuran, furan, pyran, dioxane, dimethylformamide, N-methyl pyrrolidone, dimethylacetamide, and 1-formylpiperidine) and polar aprotic solvents such as dimethyl sulfoxide and the like are excellent and preferred choices as first solvents for both polymers by virtue of their relatively high boiling points, polar character and water miscibility. Alternatives to glycerin as second solvents with both solvent power for the secondary polymer component and nonsolvent power for the major polymer component include: 2-methoxyethanol, formamide, ethylene glycol, various alcohols and the like.

For ease of processing it is preferred to use aqueous quench/wash baths, but this process need not be so limited. Similarly, the allowable ranges for the LCST and UCST phase boundaries are limited only by attainable temperature ranges based on available equipment and suitable quench media. In a process based on an aqueous quench/wash, the preferred ranges for phase boundaries are: LCST about 80° C. and UCST about 50° C.

Figure 4:
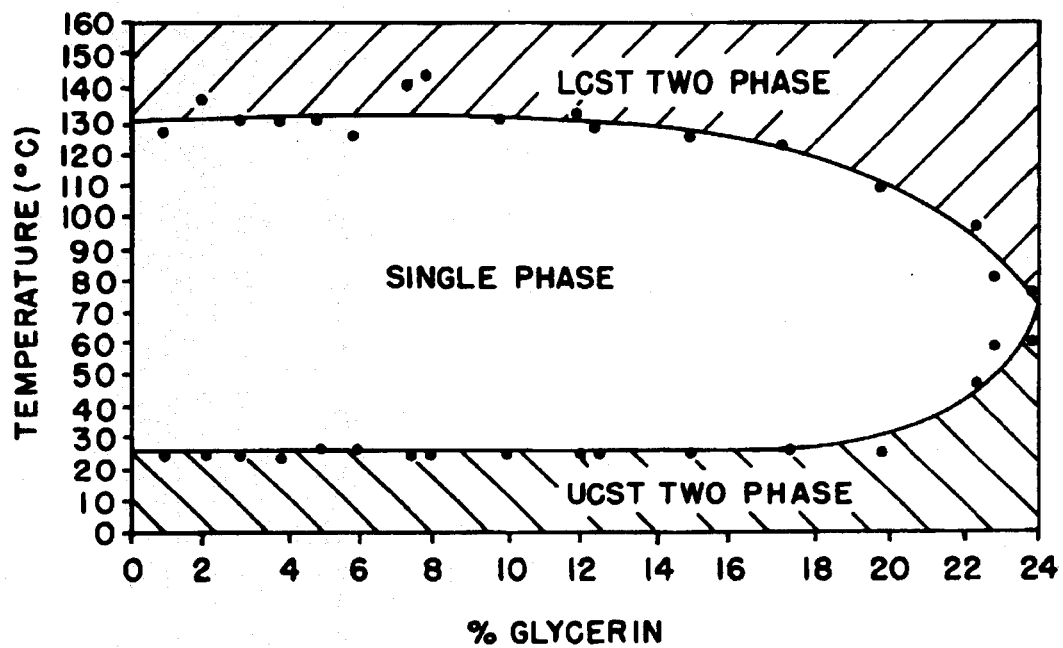
FIG. 4 shows a phase diagram for a four-component PES/PEO dope composition.

In a preferred embodiment of the invention, polyethersulfone (PES), a hydrophobic polymer, is selected as the primary polymer component of the dope composition. Poly(ethylene oxide) (PEO), N-methylpyrrolidone (NMP), and glycerin make up the secondary polymer component, first, and second solvents, respectively. The cloud point phase diagram for a series of dopes comprised of 20 wt % PES and a mixture containing 7.5 wt % (4,000 kD MW) PEO in NMP containing varying amounts of glycerin, as a percent weight of the total mixture, is shown in FIG. 4. As shown the range of temperatures in which a single phase homogeneous composition is obtained, can be varied for a given PES/PEO ratio depending on the amount of nonsolvent present. Thus the single phase temperature range can be as wide as 100° C. to as narrow as a few degrees. In most cases, the preferred range is about 30°–40° C. For the four component dope composition, it has surprisingly been discovered that a temperature phase inversion occurs not only at temperatures below the UCST but also at high temperatures, above the LCST (See FIG. 4).

FLAT SHEET MEMBRANES

It has also been discovered that membranes with substantially isotropic porous structures (i.e., structures in which the pore diameters are within about an order of magnitude or so of each other) can be prepared and preserved by subjecting the homogeneous dope composition to an abrupt change in temperature, preferably at or above the LCST, and essentially simultaneously "freezing out" the precipitated structure by introducing a nonsolvent for at least the primary polymer component. This procedure is most conveniently carried out in the case of flat sheet membranes, by immersing a liquid film of the dope composition in a nonsolvent quenching bath (e.g., water) maintained at a temperature above the LCST. Quenching the mixture above the LCST produces more open membrane structures with larger isotropic pores in the micron range. By contrast, anisotropic microporous or macrovoid-containing membranes are obtained from quench baths held below the LCST or UCST. The membrane pore sizes, besides being substantially isotropic, may thus be potentially controlled by selecting the temperature of the quench bath. Furthermore, the membranes produced by quenching above the LCST are substantially skinless having a very high density of pores in the exterior surface of the membrane.

In effect this invention has succeeded in harnessing a thermal phase inversion process initiated at a high temperature by an almost instantaneous change in the temperature of the entire dope composition which, in turn, is brought about by immersing the solution in a quenching bath. Not seeking to be limited by theory, it is believed that the resulting microphase separated binary polymer system has a substantially isotropic microstructure as a result of the uniform rapid transfer of heat. The microstructure is then "frozen" and preserved in the integral membrane by a secondary process, occurring simultaneously with the thermal phase inversion, involving the diffusion of the nonsolvent quenching medium. This combination of a high-temperature phase inversion and nonsolvent quench processes provides membranes which are substantially isotropic and which can be made relatively thick and self-supporting. The description substantially isotropic is meant to encompass perfectly isotropic pore-size distributions as well as a distribution of pore size within about 1 or 2 orders of magnitude.

It has surprisingly been discovered that a reverse pore-size distribution (i.e., large pores near membrane/solvent interface and smaller pores within membrane matrix) membrane can be prepared by a modified quench bath which contains in it a sufficient amount of strong solvent to swell the pores of the portion of the membrane in contact with the bath. After the desired pore sizes have been achieved, the strong solvent is diluted and eventually displaced with a nonsolvent wash composition. The resulting membranes can be made relatively thick and self-supporting in this fashion using the four-component dope described above. These membranes are useful in a variety of microfiltration applications particularly in the separation of blood cells from whole blood (See, Example 7.19, intra).

By employing the manufacturing process disclosed in the present invention, substantially isotropic self-supporting membrane structures of high solid content can be made. It is believed that initiating the phase inversion process at higher temperatures results in a less viscous system in which greater numbers of polymer component molecules migrate to their respective domains before the solidification or precipitation of the membrane. Such a migration process could be responsible for the larger pore structures observed for membranes prepared from quench baths kept above the LCST.

IMPROVED CO-EXTRUSION SPINNERETTE AND PRODUCTION OF HOLLOW FIBERS

For the production of hollow fiber membranes having substantially isotropic microporous structures, manufacturing procedures more sophisticated than immersing a liquid film of dope composition into a quenching bath (i.e., in the production of flat sheets) are required. For this purpose an improved spinnerette assembly, a schematic diagram of which is shown in FIG. 5, is used.

The "co-extrusion" spinnerette assembly depicted in the figure is part of an overall manufacturing system which includes among other things, pots for mixing, stirring, and holding the dope composition; pipes, tubing, or feed lines to introduce and deliver reagents, solvents, dopes, or fluids; pumps; stirrers; baths; and heating units to control the temperature of these devices, including the spinnerette assembly. An important feature of the present spinnerette is that no more than three fluid entrance ports are necessary to achieve the desired flow distribution within the device. That is, there is one port for each of the flow paths. The flow of each fluid through each port can be independently manipulated providing greater flexibility and simplicity to the overall process control. Moreover, the flow rate of the respective fluids can affect the structural characteristics of the resulting fiber.

Figure 5:
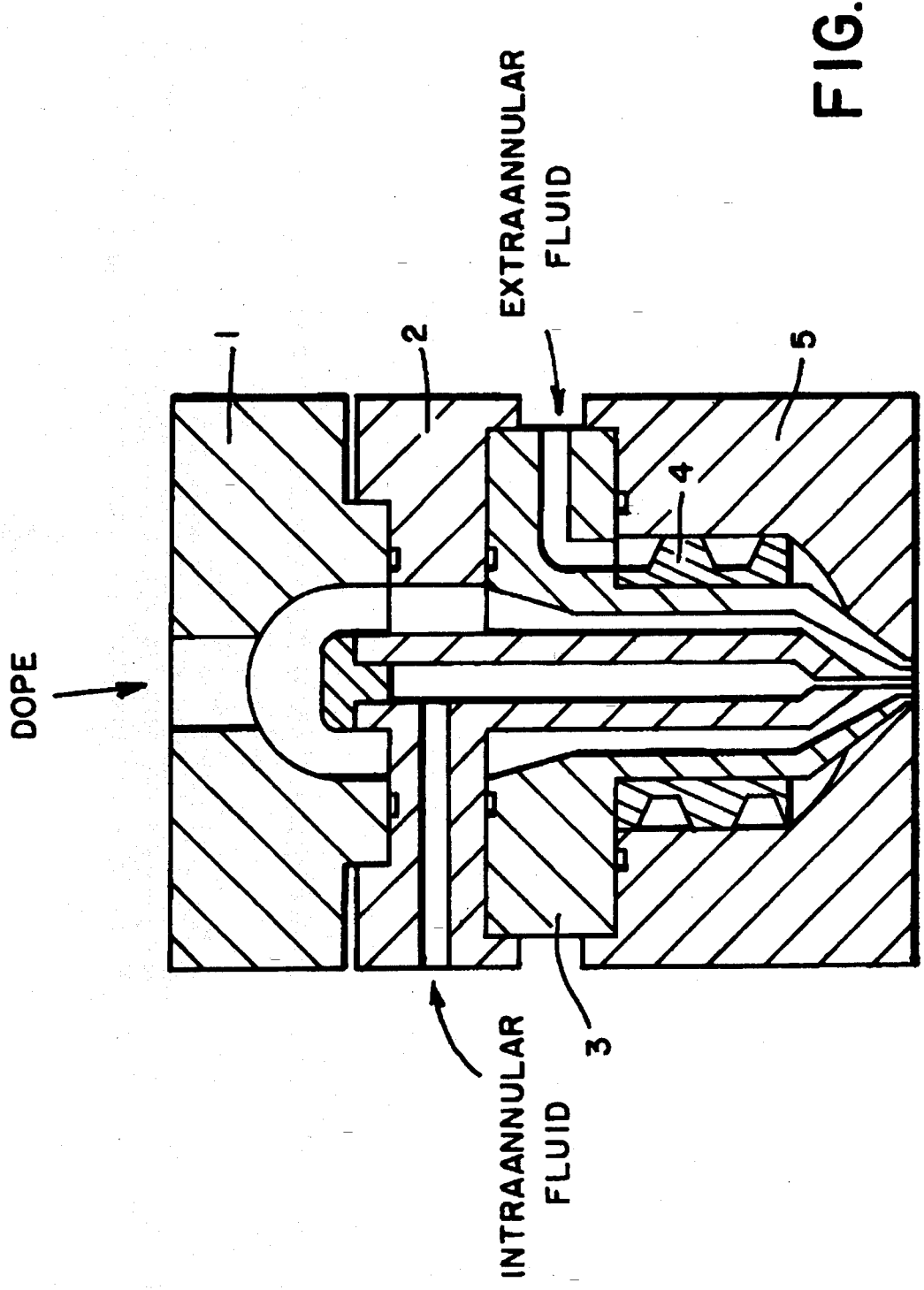
FIG. 5 shows a schematic diagram of the double annular co-extrusion spinnerette assembly of the present invention.

The co-extrusion spinnerette of FIG. 5 embodies the central feature of this invention, while providing a wide degree of versatility in the use thereof (consistent with the above teachings). As alluded to above, there are three fluid paths formed by four or five modular parts. These parts are listed below in the order in which they are labeled in FIG. 5.

1. The top portion provides containment of the dope at the top of the device and an entrance port for said dope;

2. This portion consists of a ring with a plurality of spokes radiating to the center where the spokes provide support for the hollow bore injection pin—the bore or intraannular fluid for making a hollow fiber passes through one of these spokes to the bore injection pin;

3. The port for the extraannular fluid is contained in this portion, and in conjunction with portion 5, the extraannular space is formed;

4. An optional spiral device is provided, which is designed to overcome any flow distribution problems which may arise from high viscosity solutions entering the extraannular space from a single port;

5. The face-plate of the spinnerette contains the surface (pointing downward towards the quench bath), on which the double annular configuration of this invention is evident.

Figure 6:
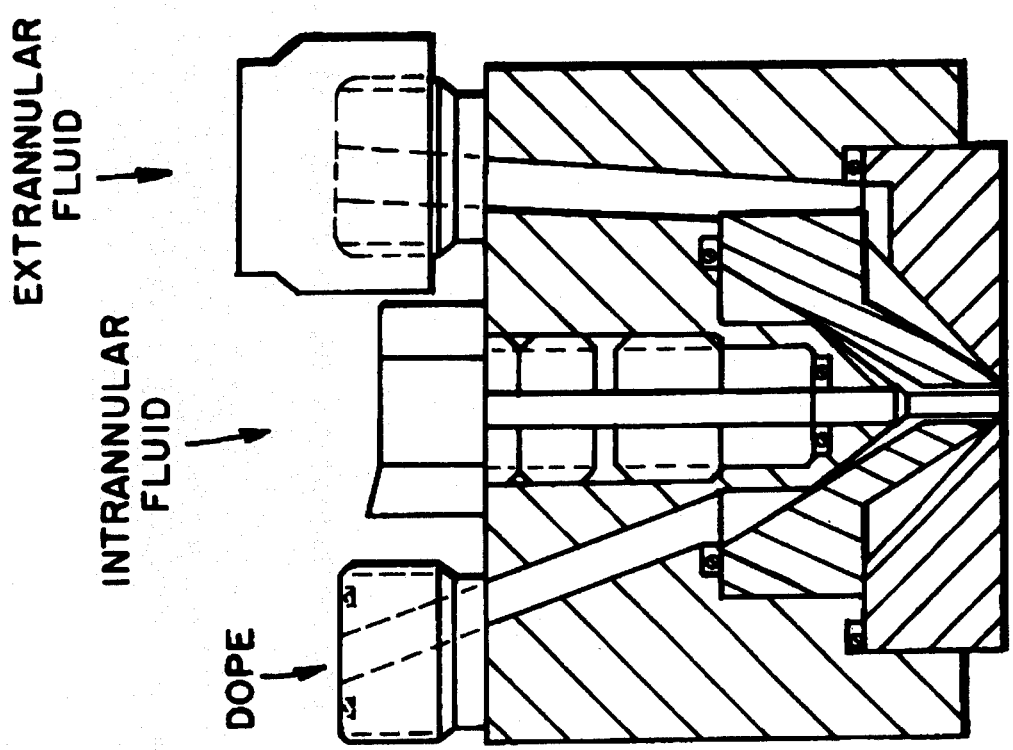
FIG. 6 shows an alternative embodiment of the double annular co-extrusion spinnerette assembly of the present invention.

Numerous alternative embodiments of this invention are possible. One example is depicted in FIG. 6, where the central theme of two mutually concentric annuli configured around a hollow pin is maintained. In this case the design emphasizes ease of device manufacture, where mass production of identical spinnerettes can be accomplished most effectively. Furthermore, by making the bore injection or intraannular fluid pass through the device vertically, it enables the use of interchangeable pins. This feature provides additional cost savings as damaged pins can be replaced modularly. Also, fibers of different dimensions can be produced readily by changing pins and/or modifying the face-plate portion.

Using the present device, an intraannular or bore injection fluid, which may be a gas, a vapor, or a liquid, can be made to emerge from the hollow pin of the central bore. Examples of a preferred intraannular fluid include, but are not limited to, an inert gas, water, water vapor, a water-miscible organic solvent, an aqueous solution of a water-miscible organic solvent, an aqueous solution of a water-soluble polymer, or mixtures thereof. Surrounding this central bore are two concentric annuli. From the inner annulus is extruded the dope solution. The dope composition emerges as a hollow tube which is prevented from collapsing over itself by the presence of the stream of intraannular fluid. As this process occurs, an extraannular fluid can be forced to flow over the outside surface of the fiber by utilizing the second, outer annulus which circumvents the first. This extraannular fluid is preferably a solvent system which is similar or the same as the intraannular solution used. Preferred nonlimiting examples of an extraannular fluid include water, alcoholic solvent, a water-miscible organic solvent, an aqueous solution of a water-miscible organic solvent an aqueous solution of a water-soluble polymer, or mixtures thereof. It is especially preferred that both fluids be maintained at a temperature above the LCST of the dope composition and are both able to serve as essentially the quenching media for the phase separated polymer system. In this manner, the inner and outer surfaces of the hollow fiber may be exposed to the same environment resulting in a more isotropic distribution of pore sizes than what would normally result in a process which does not enjoy the benefit of the outer curtain of extraannular fluid.

Using such a configuration in the process for manufacturing the hollow fiber membranes of the present invention, the variations in pore size brought about by the ambient air residing between the exit ports of the spinnerette and the normal stationary quenching/washing bath, which air is a different medium than the intraannular fluid and which is usually at a different temperature, is essentially eliminated. Thus the distance between the extrusion assembly and the stationary bath is no longer an important factor and a much greater flexibility to the placement of process equipment is subsequently achieved.

Perhaps more significantly, since the phase separation, extrusion, and quenching can be achieved in a very short span of time by employing the intra- and extraannular fluid configuration, the overall microscopic process for producing the hollow fibers more closely resembles the sequence of events which takes place during the simple flat sheet manufacturing process. Consequently, this invention is able to use essentially the same dope compositions, quenching media, and temperature settings used in preparing flat sheets, to produce hollow fibers with microstructures and characteristics similar to that of the flat sheets. Using the methods of this invention, a worker striving to develop better hollow fiber membranes may elect to experiment with and produce flat sheets because of their ease in manufacturing, while being confident that the results can be translated easily to hollow fiber structures. The benefits realized in terms of time, cost of materials, manpower, and capital costs can be significant.

Another advantage of the present invention is that expensive or relatively toxic extraannular fluids can be used to good effect employing only minimum amounts of liquid. Cost savings are again realized not only in purchasing materials but also in the subsequent disposal of waste.

Also, the use of the spinnerette assembly of the present invention offers a major improvement in manufacturing technique in that it enables one to obtain the desirable effect of high solvent content in the extraannular fluid, if desired, followed by rapid removal of the solvent on entering an aqueous quench bath. Thus, previously unobtainable membrane structures and control over structural features is now possible by the methods of the invention.

Accordingly, the role of the air gap in controlling the solvent evaporation time is largely eliminated. Thus, the distance between the spinnerette face and the quench bath becomes relatively unimportant. This distance becomes an important part of the process only if the kinetics of membrane formation is sufficiently slow or if the composition of the extraannular fluid compromises the structure of the membrane itself.

Furthermore, although the intra- and extraannular fluids may serve both to initiate the thermal phase separation and to quench the resulting microporous structure, the stationary washing/quenching bath still serves to partially quench and preserve the membrane structure. As mentioned above, the strong solvent is also washed away from the membrane in the wash process along with other contaminants. Preferably, the bath temperature should also be kept above the LCST of the dope composition.

Phase boundaries may naturally serve to define process temperatures. Typically, a temperature of about 10° C. above the LCST is employed in producing relatively isotropic microporous membranes with pores in the range of 1 μm in diameter. Dopes can be maintained in the single phase region of the phase diagram (e.g., at 60° C.) before reaching the spinnerette in the extrusion process, or equally useful, the dope may be caused to phase separate either in the dope lines or dope pot. The point up-stream of the spinnerette at which thermal phase inversion occurs does not seem to matter greatly, an observation which is contrary to the general teachings of the membrane art which teaches that dopes should be maintained in the single phase at all times until it emerges from the spinnerette. According to conventional wisdom, phase separation in any part of the spinning apparatus should be avoided because it normally results in irreproducible and inferior membrane properties (e.g., defects, closed cell matrix structure, and the like). It has been found, however, that the important consideration is that the dope attains a temperature equal to or greater than the LCST before or very soon after contacting quench media. Thus in the case of flat sheet casting, polymer dopes are preferably extruded in the single phase and quenched in about 80°–90° C. water. For hollow fibers, both the quench bath and spinnerette are preferably maintained at about 80°–90° C.

The hollow fibers which emerge from the quench bath are preferably further washed "on-line" in a series of Godet baths. A Godet bath consists of a pair of parallel drums partially submerged in a wash tank. The fibers are wrapped several times around these rotating drums, increasing the length of time that the fibers reside in the bath. Godet and wash bath temperatures are also important considerations with regard to membrane permeability and fine structure. For example, a commonly used washing temperature after the fiber has been taken off the spin line is about 60° C. (for approximately one day). However, if washing is done at room temperature instead such fibers may exhibit reduced hydraulic permeability compared with fibers washed at 60° C. These reduced Lp fibers, when subsequently washed at 60° C. or above show equivalent permeability to fibers which are washing at 60° C. immediately after being produced on the spin line.

In extruding preferred PES/PEO dope compositions a number of bore injection (intraannular) fluids can be employed to good effect. These include: water, water/solvent (e.g., NMP) mixtures, pure solvents (e.g., NMP), water soluble polymer solutions (e.g., PVA), gas (e.g., nitrogen), humidified gas, various non-solvents and liquids which are immiscible with components in the dope, according to one's ultimate goal. When making relatively isotropic microporous membranes with surface pores in the range of 1 μm, the preferred bore injection fluid is a water/NMP mixture.

Similarly, the extraannular fluid composition and flow rate can both be varied over a very wide range in order to manipulate the nature of the surface pores, or the degree of symmetry in the sub-structure. Again, for substantially isotropic structures, the intra- and extraannular fluids may be the same.

Skinned hollow fibers can be prepared by using appropriate quench solvents well known in the art (including water, water/solvent mixtures, alcoholic solvents, salt solutions, and the like). The skin may be prepared on the lumen surface or, alternatively, on the outer surface of the hollow fiber by employing a suitable intra- or extraannular fluid, however. Useful ultrafiltration (UF) membranes with unique pore size and distribution characteristics are thus produced. Other applications of these skinned fibers include auxiliary filtration, diagnostic uses, alcohol reduction, purification, and gas separation. It is important to remember that one skilled in the membrane art can take full advantage of the methods and apparatus described herein to make various adjustments and combinations in spinning conditions (e.g., nonsolvent as the intraannular fluid while using strong solvent as the extraannular fluid, operating at various temperatures, etc.) to produce a wide variety of hollow fibers with pore sizes ranging in the micron scale to tens of angstroms in size.

EXAMPLES

The following examples serve to further illustrate the present invention and should not be construed as limiting its scope. Further, these examples describe the modification of various membrane samples only as a matter of convenience. The methods of the present invention may be applied to derivatize the interfacial characteristics of any polymer having functionalizable end groups or modify the surface properties of any article of manufacture comprised of such a polymer with equal efficacy.

DETERMINATION OF AVAILABLE HYDROXYL GROUPS AND THE EFFECTS OF VARIOUS TREATMENTS

GENERAL PROCEDURE

The following procedure is a modification of that outlined by Ngo in *Biotechnology* 1986, 4, 134 for the analysis of aliphatic alcohols. The entire disclosure of this reference is incorporated herein by reference.

A microporous flat sheet PES/PEO membrane (No. 1600-1) prepared by the method described under Example 7.14 (infra), from polyether sulfone (PES, Victrex, Imperial Chemical Industries, U.S.A.) as the major polymer component and poly(ethylene oxide) (PEO, Union Carbide) as the minor polymer component, are cut into 2.5 cm discs. Two of the discs are treated with 10 mL of an acetonitrile solution containing 2 wt % of 2-fluoro-1-methylpyridinium p-toluenesulfonate (FMP, Aldrich Chemical Co., U.S.A.) and 1 wt % triethylamine, at room temperature for 15 min. The treated samples are washed with fresh acetonitrile and stored in 5 mM aqueous hydrochloric acid. Membrane samples having frontal areas of 1 to 5 cm$^2$ are immersed in 1M ethanolamine for 24 h at room temperature. The amount of imine chromophore, 2, which results from the displacement of inherent phenoxide from the FMP-treated samples is monitored spectrophotometrically at about 301 nm (extinction coefficient, E ~5900M$^{-1}$ cm$^{-1}$). The reaction of FMP-treated polymer samples having aliphatic alcohols with ethanolamine provides 1-methyl-2-pyridone as the chromophore, as described in Ngo ($\lambda_{max}$~296 nm, E ~5900M$^{-1}$ cm$^{-1}$). The available hydroxyl concentration is expressed as μmol —OH/mL membrane. Some samples are pre-conditioned by washing them with isopropanol and acetonitrile before treatment with FMP. Still others are kept in a basic solution (5N NaOH) at 80°–90° C. for 4 h and then washed thoroughly with water prior to the reaction with FMP. The results for the various samples are listed in Table I and show that the number of available hydroxyl groups increases with solvent washing and base treatment.

RESULTS FOR OTHER MEMBRANES

A second experimental PES flat sheet membrane (No. 1700-5) is prepared from a conventional 3-component dope composition according to the procedure described in U.S. Pat. No. 4,364,759 and U.K. Patent Application GB 2 047 162. The —OH groups of the membrane are analyzed as above. Some samples are pre-washed by soaking them in isopropanol for 16 h at room temperature, while others are pre-treated with aqueous base (5N NaOH, 95°–100° C., 24 h) and rinsed with deionized water, prior to FMP analysis.

Other samples include a commercial polysulfone flat sheet membrane HT-200 from Gelman Sciences, Ann Arbor, Mich., U.S.A. (0.2 μm pore-size, 25 mm diameter) which is washed extensively in deionized water and isopropanol to remove wetting agents. A commercial membrane, 0.22 μm Hydrophilic Durapore® GVWP (Millipore Corp., Mass., U.S.A.), is also analyzed as a hydrophilic membrane reference. The results are tabulated in Table I.

TABLE I

Available Hydroxyl Groups in Various Membrane Samples as Determined by FMP-Analysis

| | OH concentration[a] (μmol/mL membrane) | $\lambda_{(nm)}$max |
|---|---|---|
| 1. 1600-1 (untreated) | 0.46 | 300 |
| 2. 1600-1 (solvent-washed) | 0.59 | 299 |
| 3. 1600-1 (NaOH-treated) | 0.71 | 303 |
| 4. 1700-5 (untreated) | 1.12 | —[b] |
| 5. 1700-5 (solvent-washed) | 0.80 | —[b] |
| 6. 1700-5 (NaOH-treated) | 3.21 | 299 |
| 7. HT-200 (solvent-washed) | 0.48 | —[b] |
| 8. Durapore ® (untreated) | 72.6 | 296 |

[a]Average from at least two separate determinations.
[b]Data not available.

EFFECT OF HIGHER PRE-CONDITIONING TEMPERATURES AND LENGTH OF TREATMENT ON AVAILABLE —OH GROUPS

Flat sheet PES/PEO membranes (No. 1600-5) are prepared according to the standard method outlined below in Example 7.14. A portion of the membranes is washed with deionized water only (virgin) while another portion is additionally washed with isopropanol and then acetonitrile. Both portions are then separately treated with aqueous sodium hydroxide under various conditions. The results of hydroxyl group determination are listed in Table II and indicate that prolonged and more vigorous NaOH treatment increases the available —OH groups. The results suggest that terminal chlorophenyl groups of the PES polymer are converted to terminal phenoxy groups, resulting in an approximate doubling of the available hydroxyl functionalities.

TABLE II

Available Hydroxyl Groups in PES/PEO Membrane Samples (No. 1600-5) Treated with 5N NaOH[a]

| | Temperature/Time (°C./h) | —OH concentration (μmol/mL membrane) | $\lambda_{(nm)}$max |
|---|---|---|---|
| Virgin | 20°/16 | 0.41 | 298 |
| | 40°/16 | 0.47 | 295 |
| | 60°/16 | 0.49 | 299 |
| | 80°/16 | 0.70 | 298 |
| Solvent-Washed | 20°/16 | 0.45 | 298 |
| | 40°/16 | 0.45 | 298 |
| | 60°/16 | 0.46 | 298 |
| | 80°/16 | 0.73 | 298 |
| | 80°/64 | 0.90 | 298 |

[a]Analysis of Hydrophilic Durapore ® washed with cold water at 22° C. for 16 h gives an —OH concentration of 58.1 μmol/mL membrane at $\lambda_{max}$ = 296 nm.

REACTION OF VARIOUS MEMBRANE SURFACES WITH ETHYLENE GLYCOL DIGLYCIDYL ETHER (EGDGE)

Each of the membranes designated No. 1600-1 described in Example 6.1.1 and listed in Table I are further treated with 5N aqueous NaOH at 95°–100° C. for 24 h. The membranes are rinsed in deionized water to remove excess base and then immersed in 20 mL of an 0.6N aqueous solution of sodium hydroxide containing 10 wt % EGDGE (Aldrich Chemical Co., Milwaukee, Wis., U.S.A.) for 16 h at room temperature. Afterwards, the membrane samples are washed with fresh deionized water to remove unreacted EGDGE and subsequently exposed to an 0.1N aqueous solution of NaOH containing 1 wt % mercaptoethanol for 24 h at room temperature. The resulting samples are again rinsed with water to remove excess reagents, treated with FMP, and analyzed for —OH groups as described in Example 6.1. The results of the OH group determination are summarized in Table III.

TABLE III

Available Hydroxyl Groups in PES/PEO Membranes Treated with EGDGE and Capped with Mercaptoethanol

| | —OH concentration (μmol/mL membrane) | $\lambda_{(nm)}^{max}$ |
|---|---|---|
| 1. 1600-1 (untreated) | 1.68 | 294 |
| 2. 1600-1 (solvent-washed) | 2.16 | 295 |
| 3. 1600-1 (NaOH-treated) | 4.30 | 295 |

The foregoing examples show that the inherent functional chain ends of a hydrophobic polymer such as PES are accessible under heterogeneous conditions and may be derivatized or allowed to react with a poly- or multifunctional linker moiety such as a diepoxide. Other reagents which may be employed include, but are not limited to, epichlorohydrin, any alkylene diglycidyl ether, dihalide, or even a haloalkylene trialkyloxysilane. Even simpler linker moieties such as sulfates, sulfonates, phosphates, borates, aluminates, or silicates can be contemplated.

COVALENT GRAFTING OF HYDROXYETHYLCELLULOSE (HEC) TO VARIOUS MEMBRANE SAMPLES

PES/PEO flat sheet membranes (No. 1800-5) are prepared according to the method of Example 7.15. A number of circular discs (1.25 and 2.5 cm outside diameter) are formed with a punch. The samples are separated into five groups and each is treated as follows:

1. left as made;
2. kept in 95° C. deionized H$_2$O for 16 h;
3. autoclaved with steam at 121° C. for 15 min, then kept in 95° C. deionized H$_2$O for 16 h;
4. treated with 5N NaOH at 95° C. for 16 h; and
5. autoclaved with steam at 121° C. for 15 min, then treated with 5N NaOH at 95° C. for 16 h.

Samples from each of the five groups above are set aside for analysis (—OH group determination, non-specific protein binding (NSB), and hydraulic permeabilities (Lp), as discussed further below). The remainder of the samples are treated further as follows:

Membrane samples from each of the five groups are allowed to react with an 0.1N NaOH solution containing 10 wt % EGDGE at room temperature for 4 h. The membranes are then isolated and preferably washed with fresh cold water to fully remove unreacted EGDGE and excess base. Next, the samples are immersed in a 0.6N NaOH solution containing 2 wt % hydroxyethyl cellulose (HEC, Natrosol 250 JR, Aqualon Company, Wilmington, Del., U.S.A.) and heated to 60° C. for 16 h. Afterwards, the samples are rinsed in 60° C. H$_2$O to remove unbound components. The resulting material is referred to as 1X HEC. Samples of 1X HEC materials are treated with successive solutions of EGDGE, fresh cold water, HEC, and fresh hot water, as described above, to give 2X, 3X, 4X, and 5X HEC according to the total number of cycles used. Samples are set aside from each group for subsequent analyses.

DETERMINATION OF AVAILABLE —OH GROUPS

The concentration of available hydroxyl groups are then determined according to the FMP method described in Example 6.1. Table IV summarizes the results.

TABLE IV

Available Hydroxyl Groups in PES/PEO Membranes Before and After Covalent Grafting of HEC[a]

| Group[b] | Before Grafting[c] | After Grafting | | | | |
|---|---|---|---|---|---|---|
| | | 1X HEC | 2X HEC | 3X HEC | 4X HEC | 5X HEC |
| 1 | 0.35 | 11.6 | 15.0 | 19.5 | 21.3 | 21.8 |
| 2 | 0.36 | 10.1 | 12.0 | 14.8 | 17.9 | 18.0 |
| 3 | 0.33 | 10.4 | 11.9 | 14.6 | 17.7 | 18.6 |
| 4 | 1.18 | 10.3 | 13.7 | 15.8 | 16.4 | 17.1 |
| 5 | 1.12 | 10.9 | 15.2 | 14.5 | 16.2 | 15.9 |

[a]All values are in μmol OH/mL membrane.
[b]See text of Example 6.3 for pre-conditioning protocols.
[c]Hydrophilic Durapore ® (0.22 μm, as received) gives a value of 78.5 μmol —OH/mL membrane.

The data show that successive layers of HEC provide increasing concentrations of available hydroxyl groups. The data also show that while heating in H$_2$O or aqueous NaOH increases the number of available groups of hydroxyls before HEC grafting, it is not necessary for subsequent binding of HEC.

DETERMINATION OF NON-SPECIFIC BINDING (NSB)

Samples from each of the pre-conditioned and HEC-grafted membranes described in Example 6.3 (a total of 30) are analyzed for the non-specific binding of bovine serum albumin (BSA) as follows:

A stock solution of BSA in phosphate buffered saline (PBS) is prepared by dissolving 50 mg of BSA (monomeric BSA, ICN Biomedical, Ind., U.S.A.) in 100 mL of PBS purchased from Sigma Chemical Co. (St. Louis, Mo., U.S.A.). Sample discs (1.25 cm diameter) are shaken in 2.0 mL of the stock solution for 2 h at room temperature. The spent protein solution is decanted and the membrane samples are washed with fresh PBS (5 mL) for 15 min to remove loosely bound BSA. The washing step is repeated with fresh PBS two additional times. The membrane samples are then each placed in 5 mL glass tubes and incubated with 1.0 mL of BCA Assay Reagent (Pierce Chemical Co., Ill., U.S.A.). The assay reaction is allowed to proceed for 16 h in a shaker. The optical absorbance at 552 nm of the supernatant of each sample is read directly and compared to a standard curve generated from the absorbance values of a number of solutions of known BSA concentration. The amount of BSA bound to the membrane is then calculated under the assumption that the reactivity of the surface-bound BSA towards the BCA reagent is substantially the same as the BSA free in solution. The results are expressed in units of μg BSA/mL membrane. The results, listed in Table V, clearly indicate a marked decrease in the NSB of grafted versus ungrafted samples. In addition, it is apparent from the results of the various pre-conditioned samples that heating and a basic treatment has a beneficial effect at higher levels of HEC grafting (i.e., at 4X or 5X HEC). The NSB results of commercial membranes, both hydrophilic and hydrophobic, are included as a reference.

TABLE V

Non-Specific Binding of Bovine Serum Albumin to Various PES/PEO Flat Sheet Membrane Samples[a]

| Group | Before Grafting | After Grafting | | | | |
|---|---|---|---|---|---|---|
| | | 1X HEC | 2X HEC | 3X HEC | 4X HEC | 5X HEC |
| 1 | 1347 | 407 | 348 | 262 | 135 | 76 |
| 2 | 1099 | 600 | 431 | 279 | 215 | 110 |
| 3 | 1112 | 585 | 554 | 379 | 210 | 98 |
| 4 | 1605 | 543 | 472 | 311 | 129 | 39 |
| 5 | 1138 | 658 | 333 | 228 | 84 | 20 |
| Hydrophilic Durapore ® | 38[c] | — | — | — | — | — |
| Cellulose Nitrate/ Acetate | 1928[c] | — | — | — | — | — |

[a]All values are in units of μg BSA/mL membrane and are averaged from 4 or 5 measurements.
[b]See footnote b of Table IV.
[c]As received.

A plot of —OH concentration versus NSB has a linear relationship showing a good correlation between the two parameters.

DETERMINATION OF THE HYDRAULIC PERMEABILITIES (Lp) OF VARIOUS MEMBRANE SAMPLES

Using a standard permeability cell, the water permeabilities of 2.5 cm membrane discs obtained according to Example 6.3 are determined at a nitrogen cell pressure of 10 psig. The amount of time needed for the passage of 3–5 mL of water through each sample is measured by a stopwatch. From the volume of water collected per unit time and the membrane dimensions, one can calculate the Lp expressed as $10^{-9}$ cm$^3$/dyne sec. The results, tabulated in Table VI, show that the membrane pores remain open and unclogged, and the samples grafted with up to five layers of HEC have retained a substantial proportion of their original hydraulic permeabilities.

TABLE VI

Hydraulic Permeabilities of Various PES/PEO Membrane Samples[a]

| Group[b] | Before Grafting | After Grafting | | | | |
|---|---|---|---|---|---|---|
| | | 1X HEC | 2X HEC | 3X HEC | 4X HEC | 5X HEC |
| 1 | 904 | 814 | 689 | 501 | 518 | 546 |
| 2 | 988 | 628 | 527 | 389 | 355 | 419 |
| 3 | 946 | 512 | 573 | 372 | 330 | 390 |
| 4 | 999 | 377 | —[c] | —[c] | 467 | 467 |
| 5 | 1020 | 622 | 601 | 541 | 424 | 427 |

[a]All values in units of × $10^{-9}$ cm$^3$/dyne sec.
[b]See footnote b of Table IV.
[c]Not measured.

COVALENT ATTACHMENT OF PROTEIN A AND SUBSEQUENT UPTAKE OF IgG FROM SOLUTION

A number of the membrane discs obtained from Example 6.3 are further manipulated to covalently attach recombinant Protein A. The Protein A-coated membranes are subsequently shown to bind human IgG.

ATTACHMENT OF PROTEIN A

A stock solution of recombinant Protein A is prepared by combining 1.5 mL of a 10 mg/mL Protein A solution in deionized water (Repligen Corp., Cambridge, Mass., U.S.A.) with 23.5 mL of 30 mM NaHCO$_3$ buffer, pH 8.1 (prepared by mixing 0.637 g solid NaHCO$_3$, 0.055 g solid NAN$_3$, and 0.26 g Tween 80 (Sigma) in 250 mL deionized water). The 2.5 cm membrane discs from Example 6.3 are quartered and treated with FMP as described in Example 6.1. Polypropylene tubes, each containing 2 of the quartered FMP-activated membrane pieces, are charged with 0.9 mL of the buffered Protein A stock solution, sealed, and shaken for 16 h at room temperature. Afterwards, the spent Protein A solutions are decanted and saved for protein analysis. The membrane samples are washed twice with fresh 30 mM NaHCO$_3$ buffer (2 mL) to remove loosely bound protein and shaken at room temperature with 4 mL of a 30 mM NaHCO$_3$ buffer containing 1 wt % mercaptoethanol for 16 h to consume any unreacted FMP-activated groups. The resulting samples are then isolated and washed twice with 5 mL of the following buffers, each also containing 0.1 wt % Tween 80:0.1M NaHCO$_3$ (pH 8.1), 0.1M Tris HCl (pH 8.0), 0.1M Tris HCl containing 0.5M NaCl (pH 8.0), 0.1M glycine HCl containing 0.5M NaCl (pH 2.5), and finally, stored in 0.1M PBS (pH 7.4) containing 0.02 wt % sodium azide until used as described in the following section.

The amount of Protein A covalently attached to the modified membranes can be established from the amount of protein remaining in the spent Protein A solutions. These amounts are listed in Table VII.

TABLE VII

Amount of Protein A Bound to Various PES/PEO Membranes[a]

| Group[b] | Before Grafting | After Grafting | | | | |
|---|---|---|---|---|---|---|
| | | 1X HEC | 2X HEC | 3X HEC | 4X HEC | 5X HEC |
| 1 | — | — | — | 16.6 | 12.1 | — |
| 2 | 1.96 | 9.8 | 8.8 | — | 15.7 | 14.0 |
| 3 | 2.03 | 7.6 | 13.1 | 8.0 | — | — |
| 4 | 0.71 | — | 12.1 | 8.7 | 14.6 | 12.3 |
| 5 | 1.55 | 5.21 | — | 11.6 | 13.0 | 11.3 |

TABLE VII-continued

Amount of Protein A Bound to Various PES/PEO Membranes[a]

| Group[b] | Before Grafting | After Grafting | | | | |
|---|---|---|---|---|---|---|
| | | 1X HEC | 2X HEC | 3X HEC | 4X HEC | 5X HEC |

[a]All values are expressed in units of mg/mL membrane.
[b]See footnote b of Table IV.

The results indicate that the amount of Protein A bound is increased by binding more than one layer of HEC to the membrane.

BINDING OF HUMAN IgG

The membrane samples with attached Protein A, as prepared in the previous section, are evaluated for their ability to bind human IgG as follows:

A solution of Phosphate Buffer Solution with Tween (PBST) at pH 7.4 is prepared by dissolving 8.7 g dry phosphate buffer powder (Cat. No. 1000-3, Sigma Diagnostics, St. Louis, Mo., U.S.A.) and 1 g of Tween 80 (Sigma Chemicals) in 1000 mL of water. The pH of the PBST solution is adjusted to 8.0 by the addition of concentrated NaOH. A stock solution of human IgG (Sigma) is prepared by dissolving 9.8 mg of human IgG in 49 mL of PBST buffer solution at pH 8.0. Each of the quartered discs from Example 6.4.1 is placed in a 4 mL propylene tube along with 1.0 mL of the human IgG stock solution. The tubes are then shaken for 2 h at room temperature. Afterwards, the spent IgG solution is discarded, and the membrane discs are washed five times, at 2 to 5 min. intervals, with 2 mL of PBST at pH 7.4 to remove loosely bound IgG. Excess PBST is then removed and 0.5 mL of 0.3M citrate buffer at pH 3.0 is added to the tubes. The tubes are again shaken for 2 h at room temperature to elute any bound IgG.

A Lowry protein assay is carried out on the eluate along with appropriate control samples. The average result, obtained from two samples, are listed in Table VIII.

TABLE VIII

Amount of Human IgG Eluted from Protein A Modified PES/PEO Membrane Samples[a]

| Group[b] | Before Grafting | After Grafting | | | | |
|---|---|---|---|---|---|---|
| | | 1X HEC | 2X HEC | 3X HEC | 4X HEC | 5X HEC |
| 1 | 0.18 | NA | NA | 4.24 | 3.35 | NA |
| 2 | 0.04 | 2.71 | 1.95 | NA | 3.19 | 3.18 |
| 3 | 0 | 2.45 | 2.89 | 2.20 | NA | NA |
| 4 | 0[d] | NA | 3.33 | 4.47 | 3.96 | 4.59 |
| 5 | NA[c] | 2.53 | NA | 3.78 | 5.03 | 4.31 |

[a]All values expressed in units of mg/mL membrane.
[b]See footnote b of Table IV.
[c]Not measured.
[d]One measurement only.

The results clearly indicate that the Protein A modified membrane can efficiently bind molecules of IgG. Comparatively, the Durapore® membrane of the previous section provides 4.12 mg of bound IgG/mL membrane.

RESULTS OF ADDITIONAL EXPERIMENTS

DETERMINATION OF —OH GROUP CONCENTRATIONS AND NSB

PES/PEO membrane samples, flat sheets (No. 1900-2) prepared by the methods described in Example 7.13–7.16, infra, are divided into three parts. The first is left as made, the second kept in 95° C. water for 16 h, and the third kept in 95° C. water for 16 h, then further treated with 5N aqueous NaOH at 95° C. for 16 h. Each group is in turn divided into three additional groups: as treated, washed in acetonitrile for 16 h, or washed in isopropanol for 16 h. All the samples are then grafted with up to four treatments of HEC (4X). Samples are retained after each level of treatment for determination of —OH group concentrations and NSB analyses.

Separately, PES/PEO hollow fiber membranes, prepared according to the process described under Example 7.7, are first kept at 95° C. in $H_2O$ for 16 h, then treated with 5N NaOH at 95° C. at 16 h, and finally heated with steam in an autoclave for 15 min at 121° C. The fibers are then divided into three groups: as treated, washed in acetonitrile, or washed in isopropanol. Following the previously described procedure, each group of fibers is then grafted with up to 4 layers (4X) of HEC. Again, samples are retained at each stage for —OH group and NSB analyses.

The results for the above experiments are summarized in Table IX.

TABLE IX

Combined Results of —OH Group Determination and NSB in Various Flat Sheet and Hollow Fiber PES/PEO Membrane Samples[a]

| Group[b] | OH concentration[c] | | | NSB[c] | | |
|---|---|---|---|---|---|---|
| | As treated | MeCN washed | iPrOH washed | As treated | MeCN washed | iPrOH washed |
| I. Flat Sheet | | | | | | |
| 1. -before grafting | NA[d] | NA | NA | 928 | NA | NA |
| -1X HEC | 5.6 | 11.7 | 8.7 | 347 | 156 | 270 |
| -2X HEC | 11.4 | 18.9 | 13.9 | 233 | 56 | 193 |
| -3X HEC | 14.8 | 21.2 | 20.0 | 259 | 82 | 219 |
| -4X HEC | 18.0 | 22.8 | 18.2 | 195 | 19 | 150 |
| 2. -before grafting | 0.025 | NA | NA | 1081 | NA | NA |
| -1X HEC | 7.3 | 9.5 | 8.5 | 304 | 138 | 215 |
| -2X HEC | 13.1 | 14.2 | 14.4 | 170 | 45 | 92 |
| -3X HEC | 16.4 | 16.1 | 16.7 | 116 | 20 | 92 |
| -4X HEC | 17.3 | 20.1 | 19.9 | 83 | 5 | 59 |
| 3. -before grafting | 0.71 | 0.87 | NA | 1051 | 1373 | NA |
| -1X HEC | 5.2 | 10.8 | 8.9 | 395 | 202 | 271 |
| -2X HEC | 10.2 | 14.4 | 14.4 | 313 | 120 | 137 |
| -3X HEC | 12.0 | 19.0 | 17.6 | 212 | 90 | 145 |
| -4X HEC | 15.9 | 22.0 | 23.7 | 129 | 42 | 59 |
| II. Hollow Fiber | | | | | | |
| -before grafting | 0.285 | NA | NA | 1267 | NA | NA |
| -1X HEC | 7.5 | 18.9 | 13.1 | 428 | 236 | 343 |
| -2X HEC | 12.2 | 26.1 | 21.1 | 276 | 129 | 121 |
| -3X HEC | 14.7 | 29.6 | 22.7 | 316 | 33 | 115 |
| -4X HEC | 17.1 | 31.4 | 26.4 | 281 | NA | 76 |
| III. Durapore ® | | | | | | |
| | 91.8 | — | — | 21 | — | — |

[a]Values expressed as μmol OH or μg BSA/mL membrane.
[b]See text of Example 6.5 for pre-conditioning protocols.

TABLE IX-continued

Combined Results of —OH Group Determination
and NSB in Various Flat Sheet and Hollow
Fiber PES/PEO Membrane Samples[a]

| | OH concentration[c] | | | NSB[c] | | |
|---|---|---|---|---|---|---|
| Group[b] | As treated | MeCN washed | iPrOH washed | As treated | MeCN washed | iPrOH washed |

[c]Results are reported as the average of three separate samples.
[d]NA = not measured.

Consistent with previous findings, vigorous pre-conditioning is not always necessary to achieve good results but washing the samples in acetonitrile or isopropanol gives results superior to those obtained without either washing step.

DETERMINATION OF —OH GROUP CONCENTRATIONS AND Lp

PES/PEO flat sheet membrane batch No. 2000-8 are washed in hot 95° C. water and 95° C. 5N NaOH for 16 hours each as described previously. The membranes are then activated in 10 wt % EGDGE in 0.1N NaOH for 4 hours at room temperature, and then washed three times with cold water, 15 minutes each, to remove unreacted EGDGE and excess NaOH. Different concentrations (w/w) of the water-soluble polymers Hydroxyethyl Cellulose (HEC) (Natrosol 250 JR, molecular weight approximately 100,000, Aqualon Company, Wilmington, Del.), Hydroxypropyl Cellulose (HPC) (molecular weight approximately 110,000, Aldrich Chemical Co. ) and Dextran (Dextran T-70, molecular weight 70,000, Pharmacia, Piscataway, N.J., U.S.A.) containing 0.6N NaOH and 2 mg of sodium borohydride/ml of solution are made by mixing the respective ingredients to form a solution at room temperature. Ten, 2.5 cm diameter flat sheet membrane discs, EGDGE treated and washed, are then placed in 20 to 25 ml of the respective water-soluble polymer solutions contained in glass sample vials, and are gently mixed by swirling. The covalent grafting of the water-soluble polymers to the membrane surface at 60° C. and 90° C. are carried out by placing the vials in ovens at 60° C. and 90° C. respectively for 16 hours. Controls are also run where the starting membranes (only water and NaOH treated) and EGDGE activated membranes are immersed in water and treated at 60° to 90° C. The vials are then removed from the oven, allowed to cool, and washed consecutively with room temperature water 2 times, 15 minutes each, and with hot deionized water at 65° C., 5 times, 15 minutes each to remove unreacted water-soluble polymers and excess NaOH. The hydroxyl concentrations on the membranes are then determined as described before, and the hydraulic permeabilities are measured as described in Example 6.3.3. The results are summarized in Table X.

TABLE X

Total Hydroxyl Group Concentration and Hydraulic
Permeabilities of PES/PEO Flat Sheet Membranes
(2000-8) after Various Surface Treatments

| | Temp. 60° C. | | Temp. 90° C. | |
|---|---|---|---|---|
| Sample | —OH Conc. | Lp | —OH Conc. | Lp |
| I. Starting EGDGE treated membrane | 1.23 | 1095 | 1.86 | 1060 |

TABLE X-continued

Total Hydroxyl Group Concentration and Hydraulic
Permeabilities of PES/PEO Flat Sheet Membranes
(2000-8) after Various Surface Treatments

| | Temp. 60° C. | | Temp. 90° C. | |
|---|---|---|---|---|
| Sample | —OH Conc. | Lp | —OH Conc. | Lp |
| immersed in water | | | | |
| II. Starting EGDGE Treated membrane followed by:[a] | | | | |
| 1. 1% HEC | 13.4 | 711 | 12.1 | 486 |
| 2. 2% HEC | 8.9 | 501 | 17.5 | 300 |
| 3. 5% HEC | 14.0 | 433 | 17.0 | 325 |
| 4. 1% Dextran | 2.12 | 932 | 2.81 | 1189 |
| 5. 2% Dextran | 1.73 | 826 | 2.60 | 981 |
| 6. 5% Dextran | 2.46 | 1021 | 2.50 | 1001 |
| 7. 1% HPC | 4.76 | 1217 | 3.62 | 936 |
| 8. 2% HPC | 4.33 | 1180 | 4.65 | 1044 |
| III. Hydrophilic Durapore ® HVWP 0.22 µm control for —OH analysis | 96.8 | | | |

[a]All water-soluble polymers introduced in 0.6 N NaOH; —OH concentrations in µmol —OH/mL; membrane Lp values are in × $10^{-9}$ cm$^3$/dyne sec.

The results show that as measured by the hydroxyl group concentration, covalent grafting can be carried out using HEC, HPC and dextran as water-soluble polymers. Furthermore, the results show that there is no substantial loss of hydraulic permeabilities of the membranes, after covalent grafting to the membrane surface. Furthermore, the EGDGE can be replaced with 1,4-butanediol diglycidylether (BDE), epichlorohydrin (ECH) or like linker moieties and subjected to the same surface grafting procedures outlined above with or without added sodium borohydride. Analysis of the resultant membranes again shows a large increase in the —OH concentration and little change in the Lp irrespective of the presence of sodium borohydride.

ADDITIONAL PROTEIN BINDING EXPERIMENTS

BINDING OF HUMAN IgG FROM A MIXTURE CONTAINING FETAL BOVINE SERUM

A number of 1-inch diameter flat sheet PES/PEO membranes (No. 2100-F) and PES/PEO hollow fibers (2200-3,-4) are made according to Example 7.15 and 7.6, respectively, as usual and washed in acetonitrile for 16 hours to remove acetonitrile extractables. The flat sheets are then covalently grafted with HEC once (1X HEC) as described previously. The hollow fibers as spun, are also washed in acetonitrile to remove extractables, and coated twice with HEC (2X HEC). Commercial nylon flat sheet membrane (Ultipor® N$_{66}$™ Nylon 66, 0.2 micron, Lot No 301630, Pall Corp., Cortland, N.Y.) is also coated once with HEC. Part of the membranes were then FMP activated and stored in 5 mM HCl until used. Recombinant Protein A is loaded to the FMP activated and unactivated membranes by the method described in Example 6.4.1, the only difference being that Tween 80 is absent in the Protein A loading solution. The washing and capping procedures are identical to that described previously. The membranes are then tested for their ability to purify human IgG from a protein mixture as follows. A stock protein mixture containing 0.2 mg/ml of human IgG, containing 2% (v/v) fetal bovine serum (Cat. No. F 4884, Sigma Diagnostics) in phosphate buffered saline containing 0.1% Tween 80 is made similar to the method described in Example 6.4.2. The membranes with the Protein A attached are then placed in polypropylene tubes and tested for their ability to remove human IgG from the protein mixture as described in Example 6.4.2. The amount of protein eluted from the membranes is measured using a protein Lowry assay. The results are given in Table XI. The results show that in all cases the membranes that have been FMP-activated eluted a significant amount of protein compared to the unactivated control membrane.

TABLE XI

Human IgG Eluted from Protein A Loaded Membranes When Used to Purify IgG from a Mixture of IgG and Bovine Fetal Serum

| Sample | Amount of IgG eluted[a] mg/ml membrane |
|---|---|
| 1. Nylon, HEC coated, FMP activated and Protein A loaded. | 0.81 |
| 2. Nylon, HEC coated, Protein A loaded. | 0.051 |
| 3. Fibers 2200-3, -4, HEC coated, FMP activated and Protein A loaded. | 0.48 |
| 4. Fibers 2200-3, -4, HEC coated, Protein A loaded. | 0.057 |
| 5. Flat sheet 2100-F, HEC coated, FMP activated and Protein A loaded. | 0.67 |
| 6. Flat sheet 2100-F, HEC coated, Protein A loaded. | 0.043 |

[a]Results are the average of two readings.

SDS-PAGE RESULTS

The protein isolated from the previous example is neutralized with Tris buffer pH 8.0 (see Example 6.4), and reduced with mercaptoethanol. Sodium Dodecyl Sulfate-Polyacrylamide Gel Electrophoresis (SDS-PAGE) are run to gauge the purity of the recovered IgG. Each lane of the electrophoresis gel is loaded with 50 microlitres of the eluted solutions and controls. FIGS. 3A–3D give the results of the SDS-PAGE after mercaptoethanol reduction and silver staining along with the controls. The controls include pure IgG.

Figure 3B:
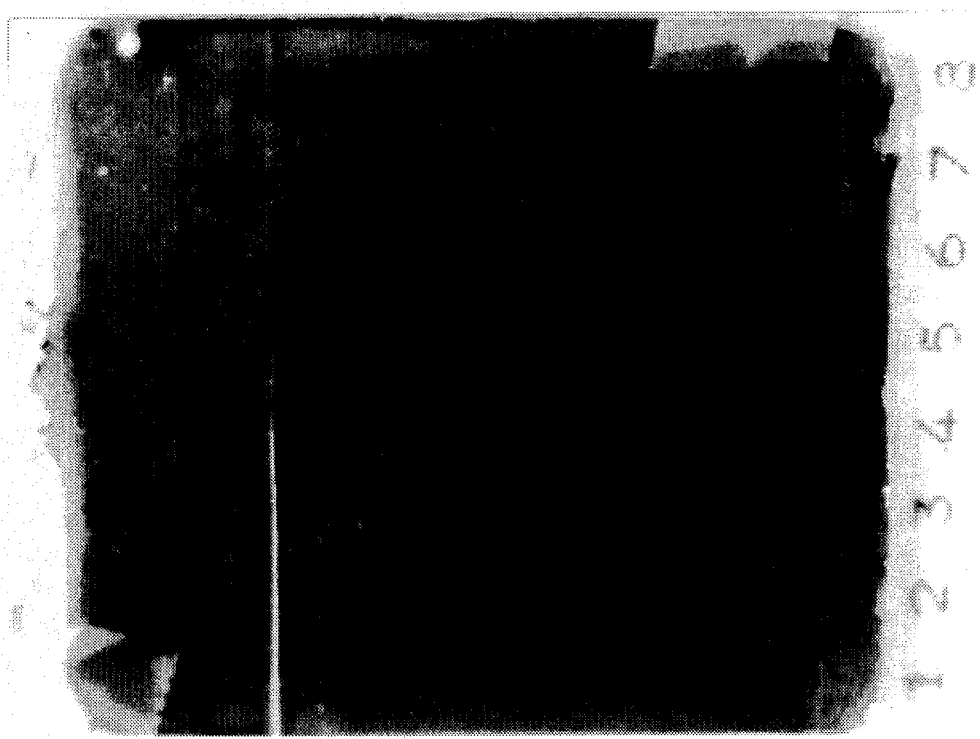
FIGS. 3A–3D show SDS-PAGE results of Immunoglobulin G samples isolated from a mixture of proteins by a process of the invention.
Figure 3A:
Figure 3D:
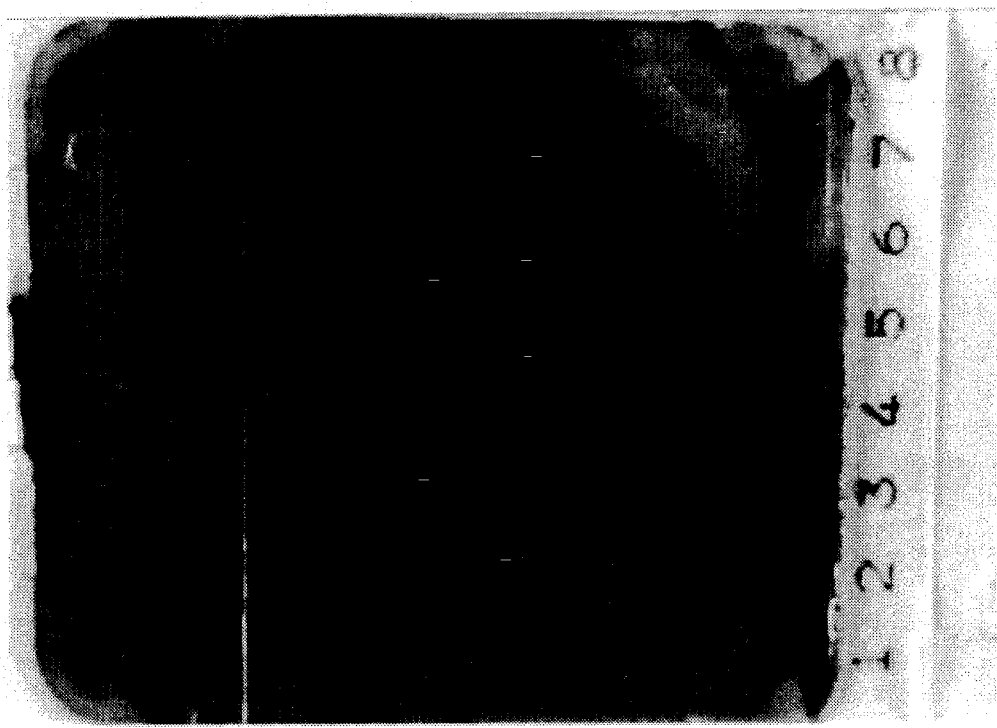
Figure 3C:
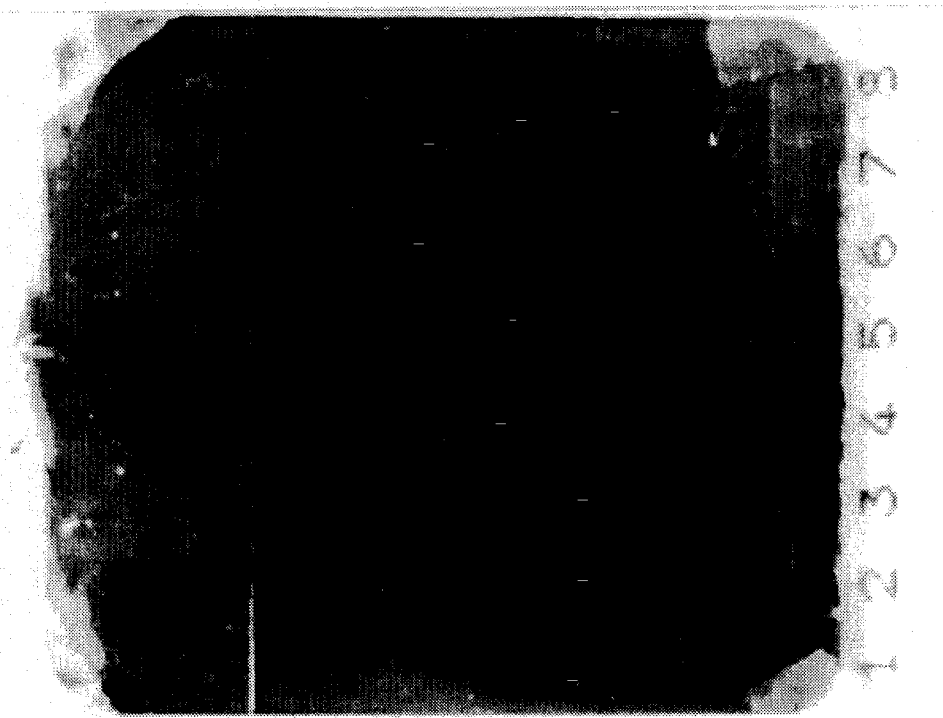

The lanes in FIG. 3A are identified as follows:

Lane 1, stock human IgG 0.2 mg/mL PBST buffer; lane 2, 2% fetal bovine serum albumin in PBST buffer; lanes 3 and 4 are duplicates of proteins eluted from HEC coated and Protein A coupling attempted control membrane; lanes 5 and 6 are duplicates of proteins eluted from HEC coated, FMP activated, and Protein A coupled membrane; lane 7, stock human IgG/fetal bovine serum mixture from which IgG purification was attempted; and lane 8, the protein molecular weight standards (Sigma Biochemicals). These results are derived from modified Nylon membranes (see entries 1 and 2 of Table XI). FIG. 3B shows the results for PES membranes (No. 2200-3,-4). The control and sample lanes are as described for FIG. 3A. Similarly, the results for membranes 2100-F are shown in FIG. 3C (see entries 5 and 6 of Table XI). FIG. 3D differs slightly from FIG. 3C in that lanes 3 and 4 are duplicates of PES/PEO membrane samples (No. 2100-F) not activated with EGDGE prior to Protein A treatment. Also, lanes 5 and 6 are duplicates of PES/PEO membranes activated with EGDGE and then coupled to Protein A directly. The control lanes are as described in FIG. 3A.

The unactivated membranes show the absence of any proteins, indicating very low non-specific binding. The results are true for the Nylon, PES/PEO flat sheet membranes as well as the hollow fibers. Thus, the covalently grafted HEC membranes containing a biological ligand such as Protein A are able to purify a specific protein such as IgG from a serum mixture.

DIRECT COVALENT BINDING OF PROTEIN A TO MEMBRANE POLYMER CHAIN ENDS

PES/PEO flat sheet membrane, No. 2100-F is treated with acetonitrile, and is activated with EGDGE as described previously. The membranes after the EGDGE activation step are then treated with 0.6 mg of recombinant Protein A in 0.1N NaOH at room temperature overnight in order to attempt the covalent binding of Protein A to the introduced epoxide groups. A control membrane which has only been treated with acetonitrile, is also subjected to the same Protein A solution in 0.1N NaOH. The membranes are then washed as described before in Example 6.4, and tested for their ability to purify human IgG from a mixture of IgG and fetal bovine serum, along with the samples described in Example 6.6. The concentration of IgG eluted as determined by the Lowry assay are given in Table XII.

TABLE XII

Human IgG Eluted from EGDGE Activated and Protein A Loaded Membrane and the Controls

| Sample | Amount of IgG Eluted[a] (mg/mL membrane) |
|---|---|
| 1. Flat sheet 2100-F EGDGE activated and Protein A loaded. | 0.342 |
| 2. Flat sheet 2100-F Protein A loaded. | 0.067 |

[a]Results average of two samples.

The results show that EGDGE activated samples bound considerably more IgG than the control membrane. FIG. 3D (supra) gives the SDS-PAGE results of the proteins eluted from the EGDGE activated membrane, control membrane, and the gel electrophoresis controls. The results clearly show the elution of IgG from the EGDGE activated membrane, and show the relative absence of IgG from the control membrane.

CHARGE-MODIFIED PES MEMBRANE SURFACES

Commercial 2.5 cm polysulfone membrane discs (Tuffryn membrane filter, HT-200, Gelman Sciences, Ann Arbor, Mich.) are washed with cold water three times to remove the water washables, and three times more with isopropanol to remove the isopropanol extractables. The membranes are then washed overnight to remove acetonitrile extractables. The membranes are then activated with 10% EGDGE in 0.6N NaOH for 4 hours to form pendant covalently bound epoxide groups. After washing the excess EGDGE with cold deionized water, some of the membranes are immersed in 2% HEC in 0.6N NaOH, others in 2% carboxymethyl cellulose (CMC) (Cellulose Gum-CMC, Type 7LF, Hercules Inc., Wilmington, Del.) in 0.6N NaOH, and still others in 2% poly(ethyleneimine) (PEI) (Molecular weight 70,000, Aldrich Chemicals, Milwaukee, Wis.). A control extracted Tuffryn membrane is also placed in deionized water. All the membranes are then placed in a water bath at 60° C. for 16 hours to commence covalent grafting. The membranes are then washed with hot deionized water at 60° C. in order to remove the unreacted water soluble polymers. The membranes are next tested for their ability to bind and elute human IgG using the standard protocol given in Example 6.4.2, except for the following differences. The human IgG is dissolved in the phosphate buffered saline with Tween 80 which has been diluted 1:10. The washings are also carried out using the same diluted buffer. The elution protocol is the same as given in Example 6.4.2. The results of the elution are given in Table XIII.

TABLE XIII

Human IgG Eluted from HEC, CMC and PEI Treated Tuffryn Commercial Polysulfone Membrane, and Controls

| Sample | mg IgG eluted/mL* membrane volume |
|---|---|
| 1. HEC coated | 0.21 |
| 2. CMC coated | 0.86 |
| 3. PEI coated | 1.27 |
| 4. Control, uncoated | 0.24 |

*Results average of two samples.

The results suggest that charge-modified membranes (entries 2 and 3 in Table XIII) are better able to bind human IgG than a simple hydrophilic (HEC) surface.

PREPARATION OF MODULES CONTAINING MODIFIED HOLLOW FIBER MEMBRANES

PES/PEO hollow fiber membranes (Batch No. 2300-6) are made as described in Example 7.2. Approximately 100, 18 inch fiber membranes are placed in a two liter beaker. The membranes are then washed in the normal manner with hot water at 95° C. for 16 hours, and then with 5N NaOH at 95° C. for 16 hours in order to maximize the surface functional end groups. Samples from the NaOH treated fiber are saved for analysis. The remaining fibers are then activated with EGDGE and grafted with HEC once (1X HEC) as described above. After washing with hot water, the fibers are divided into two groups. The first group is washed in cold water, while the second group is washed in acetonitrile. The second group of fibers is then transferred to cold water. Both groups of fibers are then given a second grafting of HEC, washed in hot water to remove unreacted HEC, and finally washed in cold water and acetonitrile as described above. This procedure is repeated once more, in order to produce a thrice HEC grafted (3X HEC) PES fiber. The samples are washed again in water and acetonitrile. Samples are saved at each stage of treatment for the determination of hydroxyl group concentration and non-specific binding, as well as permeability and Protein A coupling/human IgG binding and elution. The results of hydroxyl group and bovine serum albumin non-specific binding are given in Table XIV.

TABLE XIV

Total Hydroxyl Group Concentration (OH Conc.) and Non-Specific Binding (NSB) of PES/PEO Hollow Fibers (2300-6) after Various Surface Treatments

| Sample | —OH Conc. | NSB | —OH Conc. | NSB |
|---|---|---|---|---|
| I. After NaOH Treatment | 2.3 | 1650 | | |
| II. HEC Coated | Water-Washed Only | | Acetonitrile- | |

TABLE XIV-continued

Total Hydroxyl Group Concentration (OH Conc.) and Non-Specific Binding (NSB) of PES/PEO Hollow Fibers (2300-6) after Various Surface Treatments

| Sample | —OH Conc. | NSB | —OH Conc. | NSB |
|---|---|---|---|---|
| | | | Washed | |
| 1. Once coated | 17.3 | 67 | 21.2 | 62 |
| 2. Twice coated | 24.6 | low* | 22.2 | low* |
| 3. Thrice coated | 28.1 | low* | 29.3 | low* |
| III. Control Membrane Hydrophilic Durapore (0.22 micron) | 103.2 | low | | |

*The NSB was very low and was difficult to assign a quantitative value. The —OH concentrations are expressed as umol —OH/mL membrane volume and the NSB values are in ug monomeric BSA/mL membrane volume.

The fibers (2300-6) have an initial permeability in the $900 \times 10^{-9}$ cm$^3$/dyne sec range before coating the HEC. After grafting three times with HEC, the permeabilities are still in the 290 to $300 \times 10^{-9}$ cm$^3$/dyne sec range. This result again shows the efficiency of the present invention in generally limiting the covalent grafting onto the surface layers, while not plugging the pores of the membrane.

The fibers which have been coated three times with HEC, with acetonitrile washings in between, are then FMP activated, in a beaker, and dried in air. A hollow polysulfone module is packed with 0.5 mL of the membranes. Recombinant Protein A is then coupled to the contents of the module. The module is then tested for the ability to take up human IgG from the phosphate buffer solution containing IgG. After loading of human IgG and washing off the unbound IgG, the module elutes 4.0 mg of IgG, giving a membrane capacity of 8.0 mg IgG/mL membrane volume.

IMMUNOAFFINITY PURIFICATION OF FACTOR VIII (FVIII)

Two hundred and sixty, 22 inch PES/PEO hollow fiber membranes (Batch No. 2400-5) prepared according to the procedure described in Example 7.6 and with a hydraulic permeability of $500 \times 10^{-9}$ cm$^3$/dyne sec, are soaked in two liters of hot 95° C. water for 16 hours. The fibers are then autoclaved with steam at 121° C. for 15 min. They are then soaked in acetonitrile at room temperature for 16 hours, washed with cold water and treated with 0.6N NaOH containing 10% EGDGE for 4 hours. After washing the excess EGDGE with cold deionized water, the fibers are soaked in 0.6N NaOH containing 2% HEC at 75° C. for 3 hours and then washed with with hot deionized water at 55° C. (to remove the unreacted HEC and excess NaOH). The fibers are then treated with FMP as described in Example 6.1, and air dried. The hydraulic permeability of the FMP-activated fibers is $138 \times 10^{-9}$ cm$^3$/dyne sec with an average mean pore diameter of 0.30 μm as measured by a Coulter® Porometer. The fibers also have a hydroxyl concentration of 32.4 μmol/mL membrane. A hollow fiber module with an internal volume of 1.5 mL, is then made by packing several fibers treated as above into a polysulfone module. The final fiber membrane volume is 0.5 mL.

A NaHCO$_3$ buffer solution (pH 8.1, 15 mL) containing 0.3 mg of anti-FVIII antibody/mL is prepared by diluting anti-FVIII antibody (received as ascites fluid ESWF 7 from American Diagnostic, New York, N.Y., and purified using a Protein A column) with bicarbonate buffer (prepared according to Example 6.4.1), concentrating the resulting solution by ultrafiltration, and diluting the concentrated antibody to the appropriate concentration. The antibody solution is then recirculated at room temperature for 16 hours through the fiber module using a peristaltic pump. The loosely bound antibody is removed by washing the module with sodium bicarbonate buffer. Unreacted FMP groups are extinguished using the procedure described for Protein A in Example 6.4.1 except for the use of the pump to recirculate solvents and reagents. The module containing covalently attached antibody is then tested for its ability to pick up FVIII as described below.

FVIII concentrate (1.3 U/mg protein, Hyland Laboratories, Inc., Calif.) is diluted to 0.76 U/mL with 0.015M citrate buffer (pH 7.0) containing 0.15M NaCl. The diluted buffer solution is passed once through the fiber membrane module at a flow rate of 2 mL/min. A total of 22.9 mL (17.3 U) of buffer is passed through the module. The filtrate is saved for protein content analysis. The device is then washed with a buffer containing 0.015M sodium citrate and 0.15M NaCl (pH 7.0) until the absorbance at 280 nm of the washings is negligible indicating that no more loosely bound protein is coming off the module (ca. 30 mL). The bound FVIII is then eluted with a buffered solution containing 1 M KI, 1M lysine, 20 mM imidazole, and 5 mM $CaCl_2$ (pH 6.5). The filtrate and eluate are then assayed separately for FVIII:C activity using Stratchrom® FVIII:C Anti-hemophilic Factor Chromogenic Assay (Diagnostica Stago, 6 ter, rue Denis Papin, 92600 Asnieres, France). The filtrate is found to contain 3.3 U, indicating that the 81% of the applied FVIII is retained by the module. The eluate fraction (3.8 mL) contained a total of 8.0 U of FVIII:C activity corresponding to an overall recovery of 46% FVIII:C activity. The balance of the FVIII initially applied is assumed to be in the buffer washings. Specific FVIII:C activities of starting material (1.3 U/mg protein) and eluted FVIII (150 U/mg protein) are determined based on FVIII activity and protein concentration as measured by the Lowry protein assay, and yielded a purification factor of 115. The above procedure is not optimized and could, doubtless, be improved by lowering the flow rate, recirculating the buffered protein solution, or changing the buffer constituents, for example.

It is understood that the invention described and claimed herein is not limited to the immunoaffinity purification of FVIII as the ligate. The isolation and purification of other ligates, especially those of biological significance, by methods similar to those described above are within the scope of this invention. Examples of ligates that may be purified by immunoaffinity and biospecific recognition include, but are not limited to, tissue plasminogen activator, human coagulation factor IX, hormones, interleukins, other human and mammalian proteins, and others described previously in Section 5.

MODIFICATION OF COMMERCIAL FLAT SHEET AND HOLLOW FIBER MEMBRANES

Commercial polysulfone flat sheet and hollow fiber membranes are modified as follows to demonstrate the general applicability of this invention.

The 0.2 micron polysulfone hollow fiber membrane (Model CFP-2-E-4, AG Technology Corp., Needham, Mass.) is removed from the microfiltration module, and washed for two weeks with isopropanol in order to remove isopropanol extractables. The commercial 0.45 micron flat sheet polysulfone membrane (HT-450 Tuffryn, 25 mm diameter, Product No. 66221, Gelman Sciences, Ann Arbor, Mich.) is first washed with water to remove water extractables, and overnight with isopropanol to remove isopropanol extractables. A part of the membranes are also washed overnight for 16 hours to remove acetonitrile extractables.

Part of the membranes from each treatment is then grafted with HEC as described earlier after first treating with 10% EGDGE in 0.6N NaOH for 16 hours. The samples are then washed with hot water and saved for hydroxyl group determination and BSA-NSB. Table XV gives the results of the —OH group concentration and BSA-NSB of these membranes at various stages of the surface treatment. All the measurements are carried out in one experimental matrix with the commercial control membrane.

TABLE XV

Total Hydroxyl Group Concentration (—OH Conc.) and BSA Non-Specific Binding (NSB) to Commercial Polysulfone Fiber Membranes (AG Technology), and Commercial Polysulfone Flat Sheet Membrane (Tuffryn ™), after Various Surface Treatments

| | | Before HEC Coating | | After HEC Coating | |
|---|---|---|---|---|---|
| Samples | | —OH conc. | NSB | —OH Conc. | NSB |
| 1. | AG Technology 0.2 μm fibers isopropanol washed | 0.15 | 405 | 7.1 | 247 |
| 2. | Tuffryn, 0.45 μm flat sheets, isopropanol washed | 0.36 | 1796 | 19.0 | 504 |
| 3. | Tuffryn, 0.45 μm flat sheets, isopropanol and acetonitrile washed | NM | NM | 20.7 | 394 |
| 4. | CONTROL MEMBRANE Hydrophilic Durapore ® 0.22 μm, as received | 135.7 | 65 | | |

NM = Not measured
OH Concentrations in μmol —OH/mL membrane volume
NSB values in ug monomeric BSA/mL membrane volume

PROCESSES FOR MANUFACTURING MEMBRANES

DOPE PREPARATION AND POLYMER DRYING PROCEDURE

The dope preparation procedure involves weighing and pretreating the two polymers employed in the blend. PES, which is also known as Victrex (by ICI America, grade 5200P, obtained in 15 kg bags), is dried in an oven at 150° C. for 3 h then allowed to cool to 60° C. for several hours more. The total time of heating in the oven is not less than about 24 h. PEO (Polyox 301, MW 4000 kD, by Union Carbide Corp., obtained in 140 lb drums) is pretreated in a vacuum oven at room temperature for about 24 h. Care is taken not to leave the pretreated polymers in the open air for extended periods before adding them to the mixer.

Both NMP (i.e., N-Pyrol, Cat. No. 1-3-72755/000 & 5-72, by GAF Chemicals Corp., obtained in 55 gal drums) and glycerin (by Baxter Scientific Product Group, Mallincrodt, catalog #5092-4, Analytical Reagent) are used as received, but precautions are taken to minimize the uptake of atmospheric moisture by adding them to the mixer immediately after removal from the respective containers. Their containers should be closed tightly when they are not in use.

MIXING PROCEDURE

NMP (2812 g) and glycerin (1128 g) are pre-mixed in a 1 gal container before adding them to a Ross (model PVM2) mixer at room temperature. The Ross mixer is fitted with a source for purging with nitrogen. The inert atmosphere is maintained over all liquids until the PEO has been added. On applying pre-mixed NMP/glycerin to the Ross mixer two of the mixing blades are started: the anchor blade at 135 rpm, and the disperser blade at 3,500 rpm. PEO (360 g) is added while mixing at room temperature over the period of about one minute. A 500 gram portion of NMP is then added to make a total of 3312 gram NMP in the dope. At this point the disperser blade is switched off and Mokon heat exchange unit is set at 120° C. After 3 h of mixing, the PES (1200 g) is added over the space of 2–3 minutes, and the temperature is noted with the anchor blade maintained at 135 rpm. After an additional 18 h, a steady decrease in temperature is initiated by setting the Mokon at 60° C. Within about 1.5 h of making this temperature change, the dope usually attains a temperature of about 75–±5° C., at which time a vacuum is gradually applied to degas the mixture. Full vacuum is usually achieved within 15 min and is maintained for a further 5 min. The mixer is then switched off while continuing to degas. A vacuum is maintained for 1–2 min longer before introducing nitrogen to re-establish atmospheric pressure in the mixing vessel at 60° C.

This preparative procedure typically results in a dope viscosity of about 100,000 (±20,000) cps at 60° C. However, occasional deviations from the norm occur which do not appear to result in any ill effects in membrane properties. Such a dope has phase boundaries at about 78° C. (LCST) and about 57° C. (UCST), as shown in FIG. 4.

HOLLOW FIBER SPINNING OF RELATIVELY ISOTROPIC MICROPOROUS MEMBRANES PRIMARILY FOR AFFINITY APPLICATIONS

A dope is prepared as outlined above and is found to have a viscosity at 60° C. of 123,000 cps. This dope is extruded through the co-extrusion spinnerette schematically represented in FIG. 5. Spinnerette temperature is maintained at 80° C. throughout the duration of the experiment. Other fixed parameters preferably include:

dope pump speed—about 70 rpm
quench bath temperature—about 90° C.
quench bath composition—Deionized (DI) water
intraannular fluid composition—about 70% NMP:30% DI water (v/v)
extraannular fluid composition—about 70% NMP:30% DI water (v/v)
intraannular fluid flow rate—about 30.2 (±1.2) ml/min.
first and second godet bath temperatures—about 42.5 (±2.5) ° C.

Figure 7:
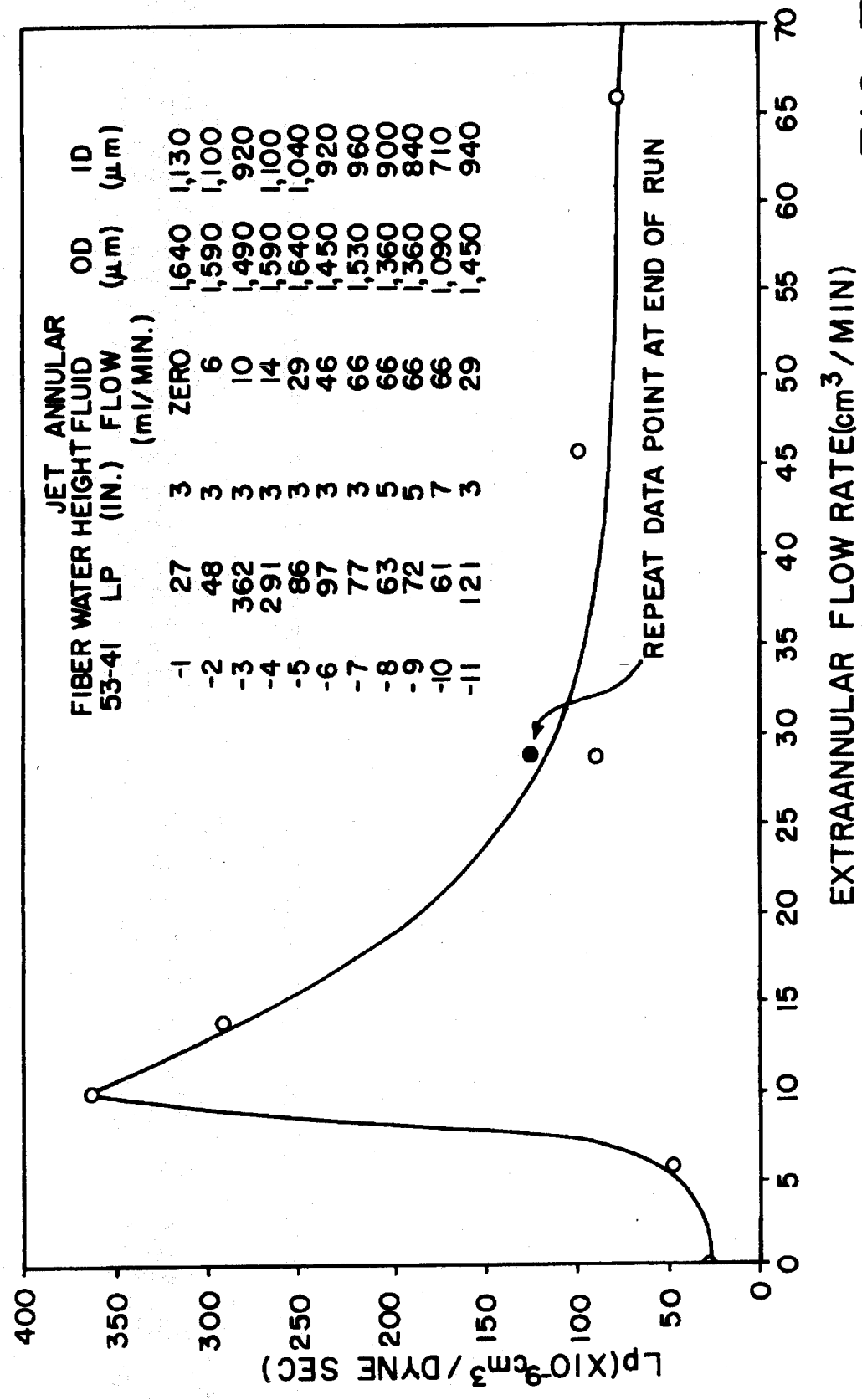
FIG. 7 shows a plot of hydraulic permeability versus extraannular flow rate employed in fiber manufacture.

Other parameters which may also be varied in this experiment are: air gap or spinnerette height above the quench bath (which results in a change in fiber take-up rate or the rate of fiber production in linear feet per minute) and extraannular fluid flow rate. The latter is varied from zero to 66 mL/min with spinnerette heights ranging from 3–7 inches. Note that the spin line contains only two godet baths. Results from this experiment are shown in FIG. 7 and in the table of data inserted as part of the figure for fibers designated 2500-1 through 11. A very pronounced dependence of membrane hydraulic permeability (Lp) for DI water on extraannular fluid flow rate is evident. Fiber 2500-1, with zero outer annular fluid flow is equivalent to a fiber produced with a conventional tube-in-orifice spinnerette.

This dependence of the Lp on the extraannular fluid flow rate is reproducible using a portion of the same dope as that used in FIG. 7 (See Table XVI for fibers designated 2600-1 through 9).

TABLE XVI

Hydraulic Permeabilities of Hollow Fibers as a Function of Extraannular Flow

| Fiber Sample | LP ($\times 10^{-9}$ cm$^3$/dyne sec) | Extraannular Flow (mL/min) | Air Gap (inches) | ID ($\mu$m) | OD ($\mu$m) |
|---|---|---|---|---|---|
| 2600-1 | 13 | 0 | 2.5 | 1000 | 1600 |
| 2600-2 | 210 | 10 | 2.5 | 930 | 1520 |
| 2600-3 | 13 | 0 | 2.5 | 1040 | 1500 |
| 2600-4 | 296 | 10 | 2.5 | 1020 | 1610 |
| 2600-5 | 33 | 0 | 2.5 | 1040 | 1620 |
| 2600-6 | 337 | 10 | 2.5 | 950 | 1500 |
| 2600-7 | 23 | 0 | 2.5 | 1000 | 1580 |
| 2600-8 | 309 | 37 | 2.5 | 1000 | 1560 |
| 2600-9 | 9 | 0 | 3.5 | 1000 | 1600 |

Fiber sample 2600-6 is examined by electron microscopy and pores in the 1–3 μm are observed on the two surfaces (See FIG. 9). Overall pore size distribution in the matrix of the approximately 300 μm fiber wall varies within the range of about 1–2 powers of ten, but the great majority of the pores are within a factor of ten of each other in size. The results indicate that this membrane is an example of a substantially skinless relatively isotropic microporous membrane. By contrast, fiber 2600-5 (which is made minus the extraannular fluid) is a far more anisotropic microporous membrane structure.

Fiber 2600-6 and others from this batch are then autoclaved, hydrophilized by grafting a composite coating onto its entire internal and external surfaces, and successfully employed in affinity and bioseparation experiments. The 1.5 mL hollow fiber modules containing 0.5 mL membrane volume are covalently functionalized to attach Protein A ligand. The IgG capacity for such modules is determined to be 7 and 8 mg/mL (for modules #13 and #14 respectively), while non-specific binding of fetal calf serum proteins have a capacity of about 1 mg/mL. The non-specifically bound proteins are easily washed off the membrane surfaces due to the hydrophilicity. High loading capacities are achievable with this fiber because of the 300 micron wall thickness, while the high hydraulic permeability for DI water is retained both after hydrophilization and chemical activation. For example, modules #13 and 14 have Lp values of $314 \times 10^{-9}$ and $191 \times 10^{-9}$ cm$^3$/dyne sec, respectively. After Protein A ligand is applied the Lp value is $149 \times 10^{-9}$ cm$^3$/dyne sec for module #14.

A wide range of microfiltration and ultrafiltration applications can be addressed by these membranes (with or without further surface modification or hydrophilization), where the relatively low protein binding surfaces minimize fouling and plugging of the matrix. Of particular interest is the use of the relatively isotropic microporous fibers (e.g., fiber 2600-6) for cell separation. This separation of cells from accompanying liquid can be achieved at very high fluxes without catastrophic decay in hydraulic permeability, which is typically observed for commercially available hollow fibers. Some examples of such cell separation applications include: clarification of cell broth and conditioned media (where affinity binding and clarification may be combined to reduce the number of unit operations in protein purification), and separation of blood cells for medical applications.

The range of extraannular flow rate demonstrated in this example (i.e., FIG. 7), with the dope and extraannular fluid combinations spanning over five orders of magnitude difference in viscosity, is not possible with the modular spinnerette disclosed in U.S. Pat. No. 4,493,629.

KEY PARAMETERS IN HOLLOW FIBER PRODUCTION

A Plackett-Burman experimental design is employed to screen six of the most likely controlling spinning parameters to determine the most important ones affecting observed hollow fiber characteristics (e.g. Lp). A dope composition is prepared in the standard manner (Example 7.1) and is found to have a viscosity of 98,000 cps at 60° C. The temperature of the dope in the lines leading to the spinerette is maintained at about 80° C. throughout the entire experiment as spinnerette temperature is varied. The two godet baths are set at between about 42°–48° C.

Data from the Placklett-Burman screening are presented in Tables XVII and XVIII. These data show (for the ranges and parameters studied), that the key parameters affecting Lp are: extraannular fluid composition, extraannular fluid flow rate and coagulation (quench/wash) bath temperature. Confidence coefficients for these three parameters are between 93–96%. The effect of spinnerette temperature is nullified by maintaining the dope-line temperature at substantially the LCST (i.e., 80° C.).

TABLE XVIII-continued

| Regression coefficients for LP | | | | |
|---|---|---|---|---|
| Coefficient | Term | Standard [error] | T-Value | Confidence[a] Coef <> 0 |
| −1.667 | AIRGAP | 32.87 | 0.0507 | 17.6% |
| −13.62 | EXTRAANN FLOW | 4.931 | 2.762 | 95.6% |
| 11.68 | QUENCH TEMP | 4.931 | 2.370 | 93.3% |

[a]Confidence figures are based on 5 degrees of freedom. Anything above 80% is considered statistically significant.

Hollow fiber membranes designated 2700-5 are produced with the optimal combination of the three key parameters under investigation as shown in Table XVII.

Thus, one may conclude that two very important new spinning parameters are made possible by the co-extrusion spinnerette of this invention. Furthermore, the degree to which one can exert control over the extraannular flow rate is high because it is not influenced by the flow of any other fluid passing through the body of the spinnerette.

Both embodiments of the co-extrusion spinnerette of this invention illustrated in FIG. 5 and FIG. 6 have proved equally effective in producing the PES/PEO fibers disclosed herein. Doubtless, other embodiments can be conceived which do not depart significantly from the spirit and scope of the invention. It is important to note that asymmetric hollow fiber membranes with novel structural features are also made possible by the use of the double annular spin-

TABLE XVII

Plackett-Burman Screening - Affinity Fiber Production

| | Controlled Factors[a] | | | | | | Characteristic |
|---|---|---|---|---|---|---|---|
| RUN # | SPINNERETTE TEMP (°C.) | INTRAANN FLUID (% NMP) | EXTRAANN FLUID (% NMP) | AIRGAP (inch) | EXTRAANN FLUID (ml/min) | QUENCH TEMP (°C.) | LP (× 10⁻⁹ cm³/ dyne sec) |
| 1 | 50.00 | 80.00 | 60.00 | 2.500 | 15.00 | 95.00 | 382 |
| 2 | 70.00 | 80.00 | 80.00 | 1.000 | 15.00 | 95.00 | N/A(458)[b] |
| 3 | 70.00 | 60.00 | 60.00 | 2.500 | 5.00 | 95.00 | 409 |
| 4 | 70.00 | 60.00 | 80.00 | 1.000 | 15.00 | 95.00 | 545 |
| 5 | 80.00 | 60.00 | 80.00 | 2.500 | 5.00 | 95.00 | 748 |
| 6 | 90.00 | 80.00 | 60.00 | 1.000 | 5.00 | 95.00 | 558 |
| 7 | 70.00 | 80.00 | 60.00 | 2.500 | 15.00 | 85.00 | 268 |
| 8 | 70.00 | 80.00 | 80.00 | 2.500 | 5.00 | 85.00 | 522 |
| 9 | 90.00 | 60.00 | 50.00 | 1.000 | 15.00 | 85.00 | 275 |
| 10 | 90.00 | 50.00 | 80.00 | 2.500 | 15.00 | 85.00 | 413 |
| 11 | 90.00 | 80.00 | 80.00 | 1.000 | 5.00 | 85.00 | 437 |
| 12 | 70.00 | 50.00 | 50.00 | 1.000 | 5.00 | 85.00 | 482 |

[a]Dope line temperature = 80° C.
[b]Estimated value

TABLE XVIII

| Regression coefficients for LP | | | | |
|---|---|---|---|---|
| Coefficient | Term | Standard [error] | T-Value | Confidence[a] Coef <> 0 |
| −836.7 | 1 (constant) | 549.3 | 1.523 | 80.6% |
| 1.032 | SPINNERETE TEMP | 2.465 | 0.4428 | 34.5% |
| −2.042 | INTRAANN FLUID | 2.465 | 0.8282 | 54.1% |
| 6.258 | EXTRAANN FLUID | 2.465 | 2.539 | 94.4% | nerette assembly similar to those in Examples 7.9 et seq., below. For examples of anisotropic microporous hollow fibers made with a conventional hollow fiber spinnerette, see Example 7.10 below.

EFFECT OF DIRECT ON-LINE WASHING AT VARIOUS TEMPERATURES

The dope employed in the following series of hollow fiber preparations is made as outlined previously, and the viscosity is found to be 98,000 cps at 60° C. Four different manufacturing conditions are investigated:

(i) Repeat of conditions used to make fiber sample 2700-5 (Example 7.3), with godet bath temperatures 49°–52°

C. [fiber 2800-1];

(ii) Repeat of conditions for fiber 2700-5 with godet bath temperatures 65°–67° C. [fiber 2800-2];

(iii) Spinning conditions identical to those used below for fibers 2200-3 and 2200-4 (Example 7.6, infra) with godet bath temperatures maintained at 44° C. [fiber 2800-3]; and (iv) Same as (iii) above with 64 hours of extra washing at 65° C. [fiber 2800-4].

The results of Table XIX demonstrate a direct correlation between godet bath temperature on the spin-line and hydraulic permeability (compare, for example, fibers 2800-1 with 2800-2). Therefore, rapid washing of the newly formed fiber at moderately high temperatures in the godet baths can enhance performance. Fibers which are made under conditions other than those used for fiber 2700-5 have significantly lower permeability to DI water (i.e., case (iii) above). Fibers which are made on the spin line in the identical fashion to fiber 2800-3 (case (iii)) are extensively washed at 65° C. in a wash tank. An average increase of about 6% in permeability is observed compared with a improvement in Lp between fibers 2800-1 and 2800-2. This result illustrates that, while improvements in permeability can be gained by post-treatment washing, direct on-line washing is preferred and is a key parameter to be optimized in the manufacture of fibers for affinity applications.

TABLE XIX

Effect of Godet Bath Temperature on Lp[a]

| Fiber 2800 | Lp (× 10$^{-9}$) cm$^3$/dyne sec (Average from 3 test modules) | Temperature (°C.) Godet Bath #1 | Temperature (°C.) Godet Bath #2 |
|---|---|---|---|
| 1 | 707 (std. dev. 36.1) | 52 | 49 |
| 2 | 887 (std. dev. 68.0) | 75 | 67 |
| 3 | 509 (std. dev. 35.0) | 44 | 44 |
| 4 | 542.5 (std. dev. 53.6) | 52 | 48 |

[a]On-line washing.

ATTEMPT TO PREPARE A LOW-SOLIDS MEMBRANE AT VARIOUS SPINNERETTE TEMPERATURES

A relatively low total solids dope is prepared by the same basic protocol described in Example 7.1, but the ingredients in the dope are as follows: 900.1 g PES; 193.8 g PEO (4,000 kD); 1326.1 g glycerin; and 3580.2 g NMP. The viscosity of this dope is 14,000 at 60° C. The cloud point phase boundaries are observed as follows: LCST about 68° C. and UCST about 55° C. In this experiment particular emphasis is placed on the effect of spinnerette temperature, extraannular fluid composition and flow rate on fiber properties and spinnability (See, Table XX).

At low spinnerette temperatures (38° C.) no suitable fibers can be collected which can be tested for Lp. This situation obtains with or without a curtain of 70% NMP in water as the extraannular fluid during dope extrusion. Spinnability (extrudability) improves dramatically at higher temperatures (e.g., 49° C.); however, fiber quality remains poor. Spinnerette temperatures in the range of 82° C. produces fibers with a completely microporous wall structure (i.e., without macrovoids and "double wall" structures). The positive effect of having an extraannular fluid combined with high spinnerette temperature is exemplified by comparing fiber samples 2900-13 and -14.

TABLE XX

Spinning Parameters Used in Producing Fibers With Low Total Solids Dope

| Fiber | Water LP (× 10$^{-9}$ cm$^3$/dyne sec) | Quench Bath Comp. | Quench Bath Temp. | Spinnerette Temp (°C.) | Air Gap (inches) | Intra-Annular Fluid (NMP/H$_2$O) | Intra-Annular Flow Rate (cc/min) | Godet Bath Temp's 1st/2nd | Extra-Annular Fluid (NMP/H$_2$O) | Extra-Annular Fluid Rate (cc/min) | Fiber OD μm | Fiber ID μm |
|---|---|---|---|---|---|---|---|---|---|---|---|---|
| 1 | — | Water | 91 | 38.2 | 1½ | 50:50 | 10 | 39/53 | NONE | ZERO | 1,740 | 1,060 |
| 2 | — | " | 91 | 37.3 | 12 | " | 10 | 44/57 | 70:30 | 11.2 | 1,500 | 820 |
| 3 | — | " | 91 | 37.1 | 12 | " | 16 | 47/50 | 70:30 | 74.6 | 1,350 | 920 |
| 4 | — | " | 90 | 37.1 | 9 | " | 15 | 47/50 | 70:30 | 74.6 | 1,250 | 820 |
| 5 | — | " | 91 | 37.0 | 6 | " | 16 | 47/50 | 70:30 | 74.6 | 1,240/1,400 | 770/880 |
| 6 | 91 | " | 91 | 49.0 | 1½ | " | 9 | 47/49 | NONE | ZERO | 1,490 | 890 |
| 7 | 23.4 | " | 92 | 82/5 | 2 | " | 8.5 | 48/49 | 70:30 | 74.6 | 1,600 | 840 |
| 8 | — | " | 91 | 48.9 | 12 | " | 8 | 48/49 | 70:30 | 55.0 | 1,260 | 680 |
| 9 | 239 | " | 92 | 82.5 | 2 | " | 18.7 | 47/38 | NONE | ZERO | 1,480 | 1,000 |
| 10 | — | " | 92 | 82.4 | 2 | " | 18 | 46/36 | 70:30 | 67.14 | 1,570/1,620 | 920/1,100 |
| 11 | — | " | 91 | 82.3 | ¾ | 70:30 | 18.5 | 467/38 | NONE | ZERO | 1,020 | 540 |
| 12 | — | " | 91 | 82.0 | ¾ | " | 18.2 | 46/39 | 70:30 | 85.8 | 980 | 500 |
| 13 | 61.2 | " | 91 | 82.3 | 1⅛ | 60:40 | 22.8 | 41/37 | NONE | ZERO | 1,160 | 640 |

TABLE XX-continued

Spinning Parameters Used in Producing Fibers With Low Total Solids Dope

| Fiber | Water LP (× 10⁻⁹ cm³/ dyne sec) | Quench Bath Comp. | Quench Bath Temp. | Spinner- ette Temp (°C.) | Air Gap (inches) | Intra- Annular Fluid (NMP/ H₂O) | Intra- Annular Flow Rate (cc/min) | Godet Bath Temp's 1st/2nd | Extra- Annular Fluid (NMP/ H₂O) | Extra- Annular Fluid Rate (cc/min) | Fiber OD μm | Fiber ID μm |
|---|---|---|---|---|---|---|---|---|---|---|---|---|
| 14 | 205 | " | 91 | 81.9 | 1⅛ | " | 28–30.5 | 47/43 | 70:30 | 74.6 | 1,300 | 800 |
| 15 | 184 | " | 91 | 82.1 | 2⅛ | " | 74.7 | 47/44 | 70:30 | 70.87 | 1,200 | 710 |
| 16 | — | " | 90 | 82.0 | 2⅛ | " | 30.5–33.7 | 47/44 | 70:30 | 67.1 | 1,100 | 630 |

ILLUSTRATION OF UNIFORM PORE SIZE BY COULTER POROMETER

Figure 8:
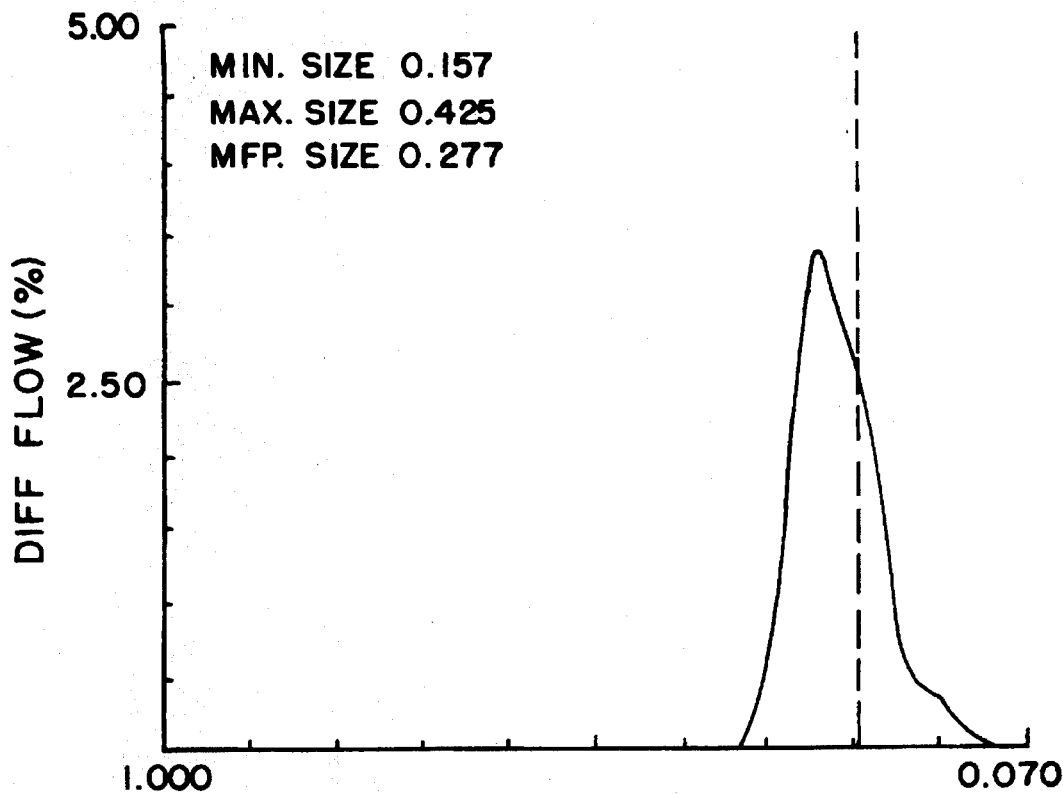
FIG. 8 is a plot of the differential flow distribution of a particular membrane sample as a function of pore size for determining pore size distribution.
Figure 9A:
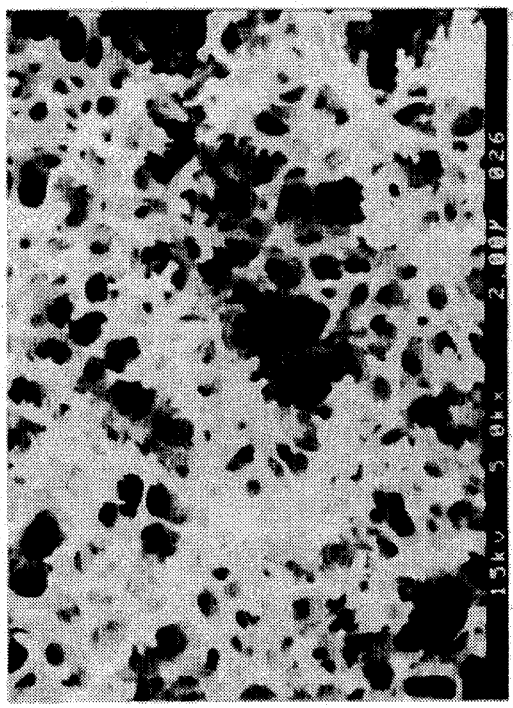
FIG. 9A is a cross-section of the hollow fiber.
Figure 9B:
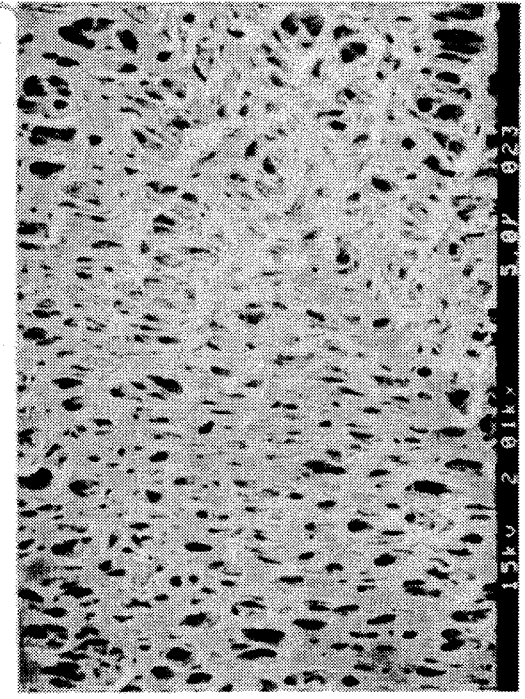
FIGS. 9B, 9C and 9D are enlargements of the body of the polymer, the lumen surface, and the exterior surface, respectively.
Figure 9C:
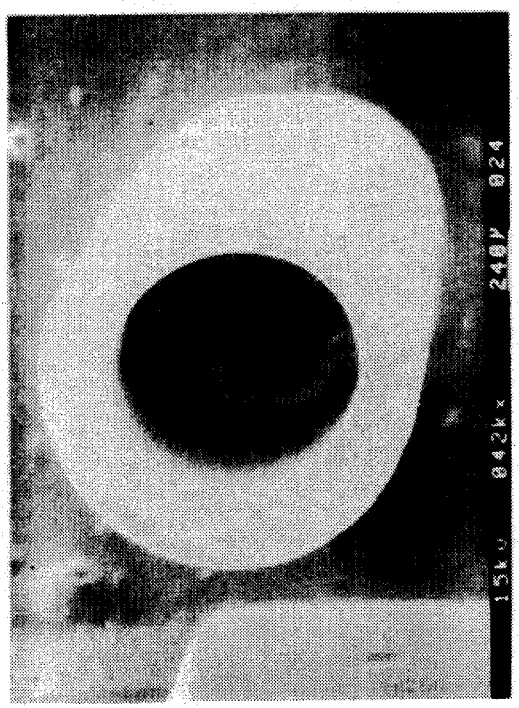
Figure 9D:
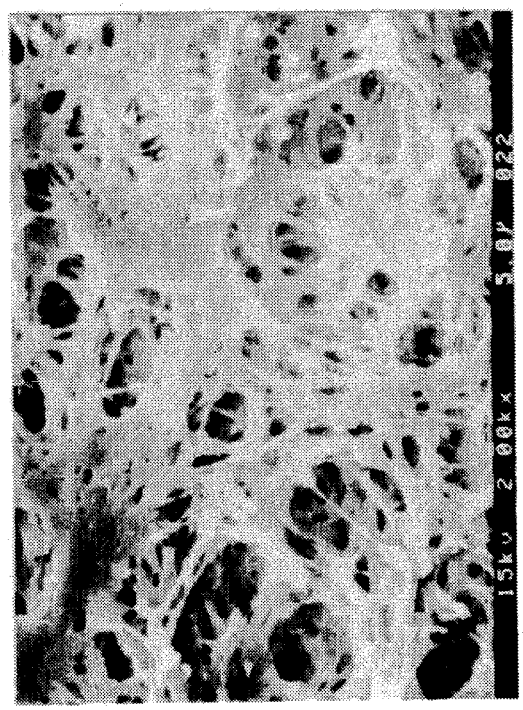

The preferred dope composition having a viscosity of 135,000 cps at 60° C. is prepared as usual. This dope is extruded to form hollow fibers using the co-extrusion spinnerette of FIG. 5. Table XXI details manufacturing conditions for fibers 2200-1 to -7, and the resulting hollow fiber membrane permeabilities and fiber dimensions. FIG. 8 contains pore size distribution data for fiber sample 2200-3 and -4 which are generated using a Coulter Porometer (manufactured by Coulter Electronics Limited, UK and which is based on the bubble point technique for pore size determination). While the precise value of the maximum pore size is not in perfect agreement with that obtained by visual examination of scanning electron micrographs from which surface pores of 1–2 μm are observed, FIG. 8 nevertheless serves to illustrate the relative isotropic structure of these membranes. Thus, there is a very narrow pore size distribution.

TABLE XXI

Process Parameters for Membranes 2200-1 Through -7

| Spin parameter | Fiber Sample | | | | | | |
|---|---|---|---|---|---|---|---|
| | 1 | 2 | 3 | 4 | 5 | 6 | 7 |
| Fiber ID (μm) | 970 | 1000 | 990 | 1000 | 950 | 1040 | 770 |
| Fiber OD (μm) | 1570 | 1620 | 1550 | 1530 | 1500 | 1580 | 1150 |
| Dope pot (°C.) | 64 | 65 | 66 | 66 | 65 | 65 | 66 |
| Quench bath (°C.) | 88 | 88 | 92 | 92 | 92 | 91 | 91 |
| Dope pump (rpm) | 69 | 69 | 69 | 69 | 69 | 69 | 35 |
| Spinnerette Temp (°C.) | 80.1 | 80.1 | 80.1 | 80.1 | 80.3 | 80.4 | 80.3 |
| Dope line (°C.) | 80.0 | 80.0 | 80.2 | 80.1 | 80.2 | 80.3 | 79.9 |
| Bore line (°C.) | 73.5 | 73.3 | 73.5 | 73.6 | 73.7 | 73.5 | 73.5 |
| Air Gap (in) | 2.5 | 2.5 | 2.5 | 2.5 | 2.5 | 2.5 | 2.5 |
| Intraannular Fluid (NMP:$H_2O$) | 70:30 | 70:30 | 70:30 | 70:30 | 70:30 | 70:30 | 70:30 |
| Extraannular Fluid (NMP:$H_2O$) | 70:30 | 70:30 | 70:30 | 70:30 | 70:30 | 70:30 | 70:30 |
| Quench bath | $H_2O$ | $H_2O$ | $H_2O$ | $H_2O$ | $H_2O$ | $H_2O$ | $H_2O$ |
| Intraannular Flow Rate (ml/min) | 24 | 24 | 24 | 24 | 24 | 24 | 17.5 |
| Extraannular Flow (ml/min) | 8.8 | 8.8 | 8.8 | 8.8 | 8.8 | 8.8 | 8.8 |
| Godet Bath #1 (°C.) | 42 | 42 | 42 | 43 | 42 | 42 | 42 |
| Godet Bath #2 (°C.) | 42 | 42 | 42 | 42 | 42 | 42 | 42 |
| Take-up Bath (°C.) | 24 | 24 | 23 | 23 | 23 | 23 | 23 |
| Lp ($\times 10^{-9}$ $cm^3$/dyne sec) | 214 | 289 | 272 | 294 | 314 | 289 | 364 |

Surface modified versions of fiber samples 2200-3 and -4 are used as affinity supports for IgG purification from protein mixtures via covalently immobilized Protein A ligand.

EFFECT OF WASH TIME AND TEMPERATURE

Hollow fibers are produced with an extraannular fluid from a dope having a viscosity of 108,000 cps at 60° C. Spin parameters employed in the experiment are detailed in Table XXII. After washing in water at about 60° C. overnight the average hydraulic permeability for DI water (based on three test modules) was determined to be $348 \times 10^{-9}$ cc/dyne sec for fiber sample 3000-1.

Similarly, another dope is prepared with a viscosity of 118,000 cps at 60° C. and hollow fibers 3100-1 through -5 are produced under substantially the same conditions as fiber 3000-1 above. All these fiber samples are produced under identical spinning conditions to provide large quantities of fibers with the same Lps. Some of these membranes (collection batch 3100-2 to -5) are employed in a series of washing experiments in which both washing time and temperature are varied. The data is presented in Table XXIII and reveals a trend of increasing Lp with increasing washing time, particularly at 20° C., and with increasing temperature. These numbers suggest that a convenient washing temperature and time for effective post-spin line washing could be about 60° C. overnight.

TABLE XXII

Process Parameters for Hollow Fiber Membrane 3000-1

| Temperature (°C.) | Dope Pot | Dope Line | Bore Line | Spinerette | Quench Bath | Godet 1 | Bath 2 |
|---|---|---|---|---|---|---|---|
| | 64 | 80.4 | 73.4 | 80.8 | 92 | 28 | 28 |

| Flow Rate ($cm^3$/min) | Intraannular Fluid | Extraannular Fluid |
|---|---|---|
| | 65 | 12 |

| Take Up Rate (ft/min)* |
|---|
| 17 |

| | Measurement | | | | |
|---|---|---|---|---|---|
| | 1 | 2 | 3 | Ave | std. dev. |
| Lp ($\times 10^{-9}$ $cm^3$/dyne sec) | 348 | 337 | 360 | 348 | 9 |

TABLE XXII-continued

Process Parameters for Hollow Fiber Membrane 3000-1

[a] Also, fiber production rate

TABLE XXIII

Results of Varying Wash Time and Temperatures After Taking the Fibers Off-Line

| Wash Temp. (°C.) | Wash Time (h) | $L_p$ ($\times 10^{-9}$ cm$^3$/dyne sec)[a] |
|---|---|---|
| 20 | 4–5 | 277 |
|  | 18–19 | 327 |
|  | 92 | 412 |
|  | 115.5 | 431 |
|  | 139 | 432 |
| 40 | 15 | 379 |
|  | 24 | 463 |
|  | 87 | 478 |
| 55 | 8 | 497 |
|  | 23 | 463 |
| 75 | 8 | 494 |
|  | 23 | 485 |
| 90 | 8 | 436 |
|  | 23 | 439 |

[a] Average from 2–7 test modules

EXTRUSIONS USING CONVENTIONAL SPINNERETTE

The PES/PEO blend dope composition described in Example 7.1 is prepared in a similar manner at about one third of the scale and other minor variations. The resulting viscosity is about 60,000 cps at 60° C. This dope is used to prepare fibers by extruding it through a conventional tube-in-orifice spinnerette (having only one annulus) with humidified nitrogen as the bore injection fluid. Hence, in this experiment there is no extraannular fluid employed. Spinning parameters are presented in Table XXIV along with permeability data for a series of test fluids. The data illustrates that useful substantially skinless and relatively isotropic microporous hollow fibers (e.g. 3200-3) can be made using conventional spinning equipment and techniques. The properties and performance characteristics of these membranes fall well below those prepared using the double annular spinnerette described in the invention, however.

TABLE XXIV

Properties of PES/PEO Hollow Fibers Produced by Humidified Nitrogen Bore Injection Medium Technique[a]

A. Permeability and Dimensional Properties for 3200 Fibers

| Fiber | ID (μm) | OD (μm) | Wall (μm) | $L_p$[b] Water | $L_p$[b] Dextran |
|---|---|---|---|---|---|
| –1 | 000 | 1,500 | 400 | 37 | 28 |
|  |  |  |  | 57 | 41 |
| –2 | 1,300 | 1,900 | 300 | 42 | 26 |
|  |  |  |  | 64 | 37 |
| –3 | 1,000 | 1,800 | 400 | 106 | 43 |
|  |  |  |  | 50 | 30 |

B. Autoclaving Studies for 3200-2 Fibers

| Fiber Treatment | $L_p$[b] Water | $L_p$[b] Dextran |
|---|---|---|
| 1. As Spun | 64 | 37 |
| 2. First Autoclaving (as loose fibers) a) | 104 | 64 |
| b) | 84 | 78 |
| 3. Second Autoclaving (module 1 & 2 above) a) | 71 | 73 |
| b) | 96 | 94 |

[a] SEM pictures reveal that surface pores are of the order:
* inner surface --- 1.0 to 2.0 μm diameter;
* outer surface --- 0.5 to 1.0 μm diameter;
* across the wall (matrix) --- 0.2–1 μm.
[b] Expressed in units of $\times 10^{-9}$ cm$^3$/dyne sec.

ANISOTROPIC MICROPOROUS HOLLOW FIBER SPINNING FOR USE IN ULTRAFILTRATION AND RELATED LIQUID SEPARATION/BIOPROCESSING APPLICATIONS

If desired, anisotropic ultrafiltration membranes can be produced as follows:

The preferred dope composition and usual method of preparation is used to make a dope with a viscosity of 126,800 cps at 60° C. A conventional tube-in-orifice spinnerette at 80° C. (approximately at the LCST) is employed to extrude fiber through an air gap, with room temperature water as both the intraannular fluid and quench or coagulation bath (i.e., quenching below the UCST). The resulting microporous hollow fiber (3300-1) has a wall thickness of ~250 μm and internal diameter of ~900 μm. Scanning electron micrographs reveal that both lumen and outer surfaces have no visible pores (i.e., it has an ultrafiltration-type skin) with a highly anisotropic membrane wall structure. Permeability and molecular weight cutoff data (which are based on fibers challenged with polydispersed dextran) confirm the ultrafiltration properties of this fiber as shown in Table XXV. Furthermore, post-treatment of this fiber is effective in reducing pore size (as shown by a lower molecular weight cutoff). Both cold water quench and certain post-treatments can be employed by those skilled in the art of manipulating membrane properties such that dialysis or even gas separation fibers can be manufactured.

TABLE XXV

Effect of Post Treatment on Lp and Molecular Weight-Cutoff (MWc) of Ultrafiltration Hollow Fibers

| Treatment[a] | Water $L_p$ (cm$^3$/dyne. sec) | MWc |
|---|---|---|
| Untreated[b] | 2.48 × 10$^{-9}$ | 233,000 |
| Treated: |  |  |
| 1 h | 2.30 × 10$^{-9}$ | 84,000 |
| 3 h | 2.42 × 10$^{-9}$ | 13,000 |
| 6 h | 2.48 × 10$^{-9}$ | 39,000 |

[a] Soaking fibers in 60 wt % NMP/39 wt % H$_2$O/1 wt % Igepal CO-850 (non-ionic surfactant) solvent mixture at room temperature.
[b] Fibers soaked in plain water.

Results show that skin permeability or selectivity can be modified without substantially affecting hydraulic resistance.

MEMBRANES WITH A SKINNED OUTER SURFACE AND A SKINLESS LUMEN SURFACE

A dope substantially the same as that in Example 7.1 is found to have a viscosity of 72,000 cps at 60° C. A conventional tube-in-orifice spinnerette in the wet spinning process (i.e. air gap at zero inches) is used. The dope line temperature is held below the UCST and the spinnerette temperature is held below the LCST (i.e., 45° C. and 68°–72° C., respectively). Humidified nitrogen intraannular fluid and 84° C. water quench bath are also employed. Highly anisotropic skinned fiber membranes result as revealed by scanning electron microscopy. By contrast, the lumen surface of this fiber is identical to that for fibers disclosed in Example 7.8. There are two major differences in spinning conditions between the fibers in Example 7.8 and fibers 3400-1 and -2: namely, the dope line temperature and air gap. The dope line temperature is believed to be the most dominant of the two factors as it has been observed in cloud point experiments that it can take several minutes to hours for a cold phase separated dope to again become clear after the temperature is raised to exceed the UCST.

Hydraulic permeability for DI water through fiber 3400-1 and -2 is 6 and $7 \times 10^{-9}$ cm$^3$/dyne sec, respectively. This ultrafiltration membrane, with the permselective (separating) skin on the outer surface, is an excellent support for an interfacially polymerized thin film composite membrane.

Additionally, fibers such as 3400-1 to -2 could find utility in immobilized enzyme bioreactors, where enzyme containment in the matrix can be achieved by virtue of the ultrafiltration (UF) skin at the outer surface as diclosed in co-pending U.S. application Ser. No. 912,595 by Matson et al. which is a continuation-in-part of U.S. application Ser. No. 786,764, the disclosures of which are incorporated herein by reference.

Fibers for membrane reactor applications, where the enzyme containment UF skin is on the lumen surface, can be readily made by this invention as witnessed by the fibers of Example 7.11 (below). Therefore, with appropriate alterations in spinning parameters and/or post-treatments apparent to those skilled in the art, a variety of fibers with different characteristics can now be manufactured.

LUMEN-SKINNED ANISOTROPIC MICROPOROUS MEMBRANES

A preferred dope composition having a viscosity of 64,000 cps at 60° C., is used to produce hollow fibers 3500-1 to -3 with a conventional tube-in-orifice spinnerette at an air gap of 2 inches. Dope line temperature is held between 65°–85° C. Bore injection fluid composition is maintained throughout at 50% NMP in water, while the quench bath is varied between 10% NMP and 50% NMP (in water). Godet baths and fiber wash tank are all at room temperature. There are no significant changes in hydraulic permeability as a function of coagulation bath composition. For example, the Lp for DI water and for water in the presence of polydispersed dextran through the fiber samples are presented in Table XXVI. The Lp values suggest that these fibers are high molecular weight cutoff ultrafiltration (or low rejection) skinned microfiltration anisotropic membranes. Electron microscope examination confirms the fact that these fibers are anisotropic with the skin (i.e., no visible pores) on the lumen surface and pores on the outer surface in the micron range.

TABLE XXVI

| | Hydraulic Permeabilities of Anisotropic Microporous Ultrafiltration Hollow Fiber[a] | |
|---|---|---|
| Fiber 110-9 | Water Lp ($\times 10^{-9}$ cc/dyne sec) | Pextran Lp ($\times 10^{-9}$ cc/dyne sec) |
| -1 | 38 | 4 |
| -2 | 35 | 6 |
| -3 | 13 | 3 |

[a]Micron-size pores on outer surface and ultrafiltration skin on lumen surface.

EFFECT OF VARYING INTRAANNULAR FLUID COMPOSITION AT LOW SPINNERETTE TEMPERATURE

A preferred dope having a viscosity of 128,000 cps at 60° C. is prepared according to Example 7.1. A conventional tube-in-orifice spinnerette is employed in fiber manufacture with about a 2 inch air gap. Dope line temperature (65° C.), spinnerette (61° C.), and quench bath (83°–95° C.) temperatures are maintained as stable as possible. Warm water godet bath temperatures are used in combination with room temperature washing after the fiber is taken off the spin line. The composition of the quench bath remains constant at 5% NMP in water throughout the experiment. The bore injection fluid composition is the key variable in this study being varied between 50 and 90% NMP in water. Determination of hydraulic permeability for water (i.e., $11-24 \times 10^{-9}$ cm$^3$/dyne sec) for fibers 3600-1 to -9, reveals that the properties of this membrane are relatively insensitive to bore fluid compositions under the prevailing spinning conditions.

CASTING OF FLAT SHEET MEMBRANES TO ACHIEVE USEFUL STRUCTURES FOR VARIED APPLICATIONS

A dope composition is prepared according to Example 7.5. This dope has a viscosity of 17,300 cps at 60° C. Flat sheet membranes are manufactured on a casting machine equipped with a mylar belt for continuous production. Key parameters in the casting process are fixed at the following values:

Dope pot/line temperature—70° C.;

Quench bath temperature—85°–90°;

Make-up rate for quench bath—2 gal/min

Knife gap—0.0125 inch (the knife is preheated in an oven to 70° C. before each batch run, and covered with aluminium foil during casting to minimize moisture uptake by dope residing in the cavity or knife-box);

Gear pump speed—108 rpm (to deliver dope to the knife-box)

Wash bath temperature—25° C.

Wash bath make-up rate—5 gal/min

Duration time of film in wash bath—15 min

Batch run time—2 min

Air gap—3.5 inches

Additional (slow) washing time—overnight

For this experiment three casting speeds are investigated to determine the impact of this parameter on the properties of flat sheet membranes 3700-1 to -6. In Table XXVII this effect is demonstrated, where both Lp for water and pore size distribution (from porometry experiments) change as a function of casting speed (between 5–15 ft/min). Therefore, the casting speed may control the pore size and structure of these substantially skinless, relatively isotropic microporous membranes.

TABLE XXVII

Characteristics of Membrane Batch Nos. 3700-1 to -6

| Casting Speed (feet/min) | Pore Size Distribution (μm) | | | Lp ($\times 10^{-9}$ cm$^3$/dyne sec) |
|---|---|---|---|---|
| | Min. | Max. | Mean | |
| 15 | 0.391 | 0.692 | 0.570 | 906 |
| 10 | 0.653 | 1.130 | 0.867 | 1128 |
| 5 | 0.877 | 1.806 | 1.239 | 1337 |

PREPARATION OF MEMBRANE BATCH NO. 1600-1 TO -6

Flat sheet membranes are produced using the equivalent dope and casting procedure detailed in the previous example. Membrane batches 1600-1 to -6 are produced at a casting speed of 5 ft/min and employed in series of surface modification and affinity purification experiments. The physical and performance characteristics of these membranes are presented in Table XXVIII. Surface area determination by BET and mercury porosimetry methods also listed.

TABLE XXVIII

PHYSICAL AND PERFORMANCE CHARACTERISTICS OF MEMBRANES 1600-1 TO -6

| Sample # | Pore Size Distribution[a] | | | H$_2$O Lp | Dex Lp | Porosity (%) | Thickness (μm) | Total Surface | |
|---|---|---|---|---|---|---|---|---|---|
| | Min. Pore | Max. Pore | Ave. Pore | | | | | (m$^2$/g)[b] | (m$^2$/g)[c] |
| 1600-1 | 0.339 | 0.663 | 0.486 | 794 | 530.3 | 83.9 | 0.0171 | 19.96 | |
| 1600-2 | 0.293 | 0.568 | 0.423 | 448 | 189.3 | | | | |
| 1600-3 | 0.263 | 0.507 | 0.368 | 545.8 | 197.7 | 83 | 0.018 | 16.87 | 9.3 |
| 1600-4 | 0.254 | 0.442 | 0.328 | 509.7 | 261.7 | 84.6 | 0.017 | | |
| 1600-5 | 0.405 | 0.768 | 0.564 | 653 | 378.7 | 72.7 | 0.0264 | 16.86 | |
| 1600-6 | 0.553 | 0.984 | 0.721 | 1017.3 | | | | 10.8 | 5.1 |

[a]Determined using a Coulter Porcueter and expressed in μm.
[b]Mercury porosimtry method.
[c]Brunauer-Emmett-Teller nitrogen adsorption technique.

ADDITIONAL MEMBRANE BATCHES

Flat sheet membranes 3800-1 to -3 are prepared as above except that the quench bath temperature is set at 81° C. The Lp for DI water through these membranes are found to be in the range of 1,000×10$^{-9}$ cm$^3$/dyne sec.

Similarly, Batch Nos. 2100-A to -G are found to have an Lp of 981 to 1,600×10$^{-9}$ cm$^3$/dyne sec. A quench bath temperature of 85° C. and a casting speed of 5 ft/min are used.

Membrane Batch Nos. 2000-1 to -8 are prepared as above with quench bath temperatures in the range of 83°–86° C. Hydraulic permeabilities of 500–>1,000×10$^{-9}$ cm$^3$/dyne sec are found. In addition, porometer analysis reveals a range of 0.14–0.67 μm for the pore sizes.

PREPARATION OF PRECIPITATED THIN FILM MEMBRANES

A 20 g dope composition is prepared by weighing all four ingredients directly into a 50 mL round bottom flask at room temperature. The contents of this flask are stirred with the aid of a high torque motor, glass rod shaft and teflon stirring blade overnight at anywhere from 60° to 90° C. Degassing is done by allowing the hot dope to stand for a couple of hours. Preferably, degassing is done at 60° C. because most studies are initiated with the dope in its single phase region of the cloud point phase diagram.

Such dopes are used to determine cloud point phase diagrams, determining viscosities in selecting spin dope compositions, and making hand cast films. The latter is accomplished by incubating the round bottom flask containing the dope, a clear glass plate and a Gardner blade either in an oven or on a hot plate at 60° C. A small portion of dope is applied to the glass plate and drawn down to make a liquid film of about 10 mil thickness still at 60° C. The solution film on the glass plate is quenched in an 85° C. quench batch quickly. A white precipitated film forms immediately and typically floats off the glass plate within about a minute or so. This film is then washed in warm running tap water overnight before conducting any tests.

EFFECT OF QUENCH BATH TEMPERATURE ON STRUCTURE OF PRECIPITATED THIN FILM MEMBRANE

A four component dope is prepared as described above with the following composition:

PES (15 wt %), PEO (4,000 kD, 4.5 wt %), glycerin (20.4 wt %), and NMP (60.1 wt %). Films are hand cast to determine the effect of aqueous quench bath temperature on membrane properties. The results are presented in Table XXIX. The profound impact of the quench temperature on both membrane structure and permeability/selectivity is evident.

TABLE XXIX

Effect of Aqueous Coagulation (Quench) Bath Temperature on Membrane Performance and Structure[a]

| Aqueous Quench Bath Temp (°C.) | H$_2$O | Dextran | MWc Dextran | Membrane Structure |
|---|---|---|---|---|
| 85 | 74 | 5 | >2,000,000 | Substantially Isotropic Microporous |
| 60 | 14 | 4 | >2,000,000 | Anisotropic Microporous |
| 14 | 15 | 3 | 73,000 | Anisotropic Macrovoid-type |

*LCST = 80° C., UCST = 43° C. Dope Temperature: 60° C. MWc = molecular weight cutoff

DEPENDENCE OF DOPE PROPERTIES ON GLYCERIN CONTENT

Dope preparation and hand casting protocols detailed in Example 7.16 are appropriately modified to study the effect of glycerin concentration on the LCST and UCST phase boundaries of a series of dopes and on the properties of the resulting membranes. For this particular dope composition, it can be seen from Table XXX that as the glycerin concentration decreases, the LCST increases above the quench bath temperature and some macrovoids appear in the membranes. The UCST is observed to decrease as the glycerin concentration decreases.

TABLE XXX

Effect of Glycerin Concentration on Dope and Membrane Properties
Dope Composition in wt %: PES(15):PEO(3.2):Glycerin(X):NMP(balance)
Dope temperature - 60° C.
Water quench bath temperature - 80° C.

| X | LCST (°C.) | UCST (°C.) | Lp$^a$ Water | Lp$^a$ Dextran | MWc$^b$ | Top Surface Pores (μm) | Membrane Structure |
|---|---|---|---|---|---|---|---|
| 20.4 | 92 | 23 | 40 | 7 | >2,000,000 | 0.2 | Microporous/Macrovoid |
| 21.2 | 83 | 45 | 109 | 42 | " | — | Microporous |
| 21.7 | 82 | 50 | 113 | 69 | " | 0.1 | Microporous |
| 22.1 | 68 | 55 | 159 | 70 | " | 0.2 | Microporous |
| 23.0$^c$ | — | — | — | — | — | — | — |

$^a$Lp represents hydraulic permeability (× 10$^{-9}$) in units of cm$^3$/dyne sec.
$^b$MWc represents molecular weight cutoff, i.e., the molecular weight for polydispersed dextran which is 90% rejected by the membrane.
$^c$Incompatible dope.

PRODUCTION OF SERUM FROM WHOLE BLOOD

Dope of the type detailed in Example 7.1 is hand cast in the manner similar to that outlined in Example 7.16:

Quench bath composition— 400 g NMP: 5 gm Igepal C0-850 (by GAF): 95 g water;

Gardner blade setting—35 mil

Duration time in quench bath—3 min

Water is slowly added to the quench bath after three minutes to cause complete precipitation of the membranes before washing in running water.

Membranes 3900-9 are anisotropic with wall thicknesses of 300–350 μm, and surface pores between 10–30 μm (on the surface in contact with the quench medium) and in the range of 3–8 μm (on the surface in contact with the flat surface or glass plate). The entire internal and external surfaces of these membranes are then modified by the process detailed in Example 6.10. They are then challenged with whole blood. When a few milliliters of blood are placed on the surface of these membranes and rapidly enter the matrix. Only straw colored plasma emerges on the opposite side. Electron micrographs of films used to separate blood cells in this manner are found to be completely clogged with debris. This result indicates that these membranes may find utility in a variety of diagnostic applications, such as sample handling to produce plasma without employing a centrifuge.

The amount of plasma recovered appears to be ample for a variety of possible diagnostic tests. For example, glucose levels can be determined, and a DNA hybridization assay can be conducted to identify any potential microbial contamination.

It should be apparent to one skilled in the art that the membranes described herein can be used in a number of fluid separation process applications, including bioprocessing, as tailored according to the demonstrated controlling process parameters. In addition to affinity applications a wide range .of microfiltration and ultrafiltration applications can be addressed by these membranes, with or without additional hydrophilization. The relatively low protein binding surfaces minimize fouling and plugging of the matrix. Of particular interest is the use of the relatively isotropic microporous fibers (e.g. fiber 2600-6) for cell separation. Separation of cells from an accompanying liquid can be achieved at very high flux without catastrophic decay in the hydraulic permeability of the membrane, a result typically observed for commercially available hollow fibers. Some examples of such cell separation applications include: clarification of cell broth and conditioned media, where affinity binding and clarification may be combined to reduce the number of unit operations in protein purification; and separation of blood cells for medical applications.

It should be apparent to one skilled in the art that other embodiments may be conceived which do not depart significantly from the spirit and scope of the present invention. The invention should, therefore, not be limited to the foregoing example, but only by the accompanying claims.

What is claimed is:

1. A process for modifying the surface properties of a hydrophobic polymer chosen from the group consisting of polysulfones and polyethersulfones comprising:

(a) treating said hydrophobic polymer with an alkali hydroxide, whereby hydroxyl groups are formed to increase the number of functionalizable chain ends;

(b) contacting said hydrophobic polymer with a solution comprising a first solvent, which is nonsolubilizing to said hydrophobic polymer, and a linker moiety capable of covalently bridging said hydrophobic polymer to a macromolecule, for a length of time sufficient to form a covalent bond between a hydroxyl functionalizable chain end of said hydrophobic polymer and said linker moiety; and (c) contacting the reacted hydrophobic polymer of step (a) with a solution comprising a second solvent, which is nonsolubilizing to said hydrophobic polymer of step (a), and said macromolecule, for a length of time sufficient to covalently bind said macromolecule to said covalently bound linker moiety, to provide a product hydrophobic polymer with modified surface properties.

2. A process for modifying the surface properties of a hydrophobic polymer chosen from the group consisting of polysulfones and polyethersulfones comprising:

(a) treating said hydrophobic polymer with an alkali hydroxide whereby hydroxyl groups are formed to increase the number of functionalizable chain ends;

(b) contacting said hydrophobic polymer with a solution comprising a first solvent, which is nonsolubilizing to said hydrophobic polymer, and a linker moiety capable of covalently bridging said hydrophobic polymer to a macromolecule, for a length of time sufficient to form a covalent bond between a hydroxyl chain end of said hydrophobic polymer and said linker moiety;

(c) contacting the reacted hydrophobic polymer of step (b) with a solution comprising a second solvent, which is nonsolubilizing to said hydrophobic polymer of step (b), and said macromolecule, for a length of time sufficient to covalently bind said macromolecule to said covalently bound linker moiety;

(d) contacting the reacted hydrophobic polymer of step (c) with a solution comprising a third solvent, which is nonsolubilizing to said hydrophobic polymer of step (b), and a reagent capable of producing active sites on said covalently bound macromolecule; and (e) contacting the reacted hydrophobic polymer of step (d) with a solution comprising a fourth solvent, which is nonsolubilizing to said hydrophobic polymer of step (b), and a ligand, which ligand is capable of reacting with said active sites on said covalently bound macromolecule, for a length of time sufficient to covalently bind said ligand to said covalently bound macromolecule, to provide a product hydrophobic polymer with modified surface properties.

3. The process of claim 1 or 2 which further comprises washing said hydrophobic polymer with fresh solvent after each step to remove any residual unbound materials.

4. The process of claim 1 or 2 which further comprises repeating all the enumerated steps at least one time to achieve the desired level of modification.

5. The process of claim 1 or 2 which further comprises subjecting said product hydrophobic polymer to reaction conditions effective to crosslink the molecules of said macromolecule to each other.

6. The process of claim 2 which further comprises subjecting said product hydrophobic polymer to reaction conditions effective to crosslink the molecules of said ligand to each other.

7. The process of claim 1 or 2 in which said hydrophobic polymer is a membrane.

8. The process of claim 1 or 2 in which said hydrophobic polymer is a substantially isotropic membrane.

9. The process of claim 1 or 2 in which said hydrophobic polymer is an anisotropic membrane.

10. The process of claim 1 or 2 in which said hydrophobic polymer is a skinned anisotropic membrane.

11. The process of claim 1 or 2 in which said hydrophobic polymer is a substantially isotropic microporous hollow fiber membrane.

12. The process of claim 1 or 2 in which said hydrophobic polymer is a skinned anisotropic hollow fiber membrane.

13. The process of claim 1 or 2 in which said hydrophobic polymer is a manufactured article.

14. The process of claim 1 or 2 in which said hydrophobic polymer is a manufactured article produced by a method of injection molding, compression molding, or blow molding.

15. The process of claim 1 or 2 in which a functional group of said linker moiety forms said covalent bond with said functionalizable chain end of said hydrophobic polymer.

16. The process of claim 1 or 2 in which a functional group located at one end of said linker moiety forms said covalent bond with said functionalizable chain end of said hydrophobic polymer.

17. The process of claim 1 or 2 in which a functional group located between the ends of said linker moiety forms said covalent bond with said functionalizable chain end of said hydrophobic polymer.

18. The process of claim 1 or 2 in which said linker moiety is a molecule having at least two functional groups selected from the group consisting of epoxide, carbonyl, carboxyl, amine, halide, sulfonyl, hydroxyl, and combinations thereof.

19. The process of claim 1 or 2 in which said linker moiety has a molecular weight less than about 2000.

20. The process of claim 1 or 2 in which said linker moiety incorporates a functional group selected from the group consisting of silicon, aluminum, tin, boron, phosphorus, sulfur, and nitrogen.

21. The process of claim 1 or 2 in which said linker moiety incorporates a functional group selected from the group consisting of a silicate, aluminate, stannate, borate, phosphate, and sulfonate.

22. The process of claim 1 or 2 in which said linker moiety is a hydrocarbon molecule which incorporates at least two terminal functional groups selected from the group consisting of hydroxyl, amino, halide, carboxyl, acid chloride, acid anhydride, carbonyl, epoxide, sulfonyl chloride, and combinations thereof.

23. The process of claim 1 or 2 in which said linker moiety is selected from the group consisting of ethylene glycol diglycidyl ether, 1,4-butanediol diglycidyl ether, epichlorohydrin, and 2,4,6-trichloro-S-triazine.

24. The process of claim 1 or 2 in which said macromolecule is hydrophilic.

25. The process of claim 1 or 2 in which said macromolecule is hydrophobic.

26. The process of claim 1 or 2 in which said macromolecule has an average molecular weight of about 0.1 to about 5,000 kilodaltons.

27. The process of claim 1 or 2 in which said macromolecule is amphoteric.

28. The process of claim 1 or 2 in which said macromolecule has a functional group capable of bearing a charge.

29. The process of claim 1 or 2 in which said macromolecule has an ionizable functional group.

30. The process of claim 1 or 2 in which said macromolecule has a nonionic functional group.

31. The process of claim 1 or 2 in which said macromolecule is selected from the group consisting of natural polymer, synthetic polymer, derivatives, mixtures, and copolymers thereof.

32. The process of claim 1 or 2 in which said macromolecule is a surfactant.

33. The process of claim 1 or 2 in which said macromolecule is a biologically active species selected from the group consisting of monoclonal antibody, polyclonal antibody, antigen derivatives, and mixtures thereof.

34. The process of claim 1 or 2 in which said macromolecule is selected from the group consisting of polysilane, polysiloxane, polysulfonate, polycarboxylate, hydroxyalkylcellulose, dextran, diethylaminoethyldextran, carboxymethylcellulose, poly(ethylene imine), poly(carboxymethylethylene imine) and poly (vinyl alcohol), derivatives and mixtures thereof.

35. The process of claim 2 in which said ligand is selected from the group consisting of long chain aliphatic hydrocarbon silane, branched aliphatic hydrocarbon silane, aromatic hydrocarbon silane, and mixtures thereof.

36. The process of claim 35 in which said hydrocarbon silane incorporates a functional group consisting of hydroxy, amino, carboxyl, sulfonyl, cyano, nitro, mercapto, sulfate, phosphate, isocyano, halo, amido, carbonyl, and combinations thereof.

37. The process of claim 2 in which said ligand is selected from the group consisting of carbohydrate, amino acid, liposome, protein, oligonucleotide, synthetic dye, natural dye, derivatives, and mixtures thereof.

38. The process of claim 2 in which said ligand is selected from the group consisting of monoclonal antibody, polyclonal antibody, antigen, receptor derivatives, and mixtures thereof.

39. The process of claim 2 in which said ligand is selected from the group consisting of natural Protein A, recombinant Protein A, Avidin, Biotin, Heparin, animal cell surface receptor, plant cell surface receptor, and bacterial cell surface receptor.

40. The process of claim 2 in which said ligand is an antibody against a molecule selected from the group consisting of immunoglobulin G, immunoglobulin M, immunoglobulin A, immunoglobulin E, tissue plasminogen activator, human interleukin protein, human chorionic gonadotropin, thyrotropic hormone, carcinoembryonic antigen, α-fetoprotein, transforming growth factor, and interferon.

41. The process of claim 1 in which said nonsolubilizing solvents are different.

42. The process of claim 2 in which said nonsolubilizing solvents are different for some or all of the steps.

43. The process of claim 1 or 2 in which said nonsolubilizing solvents are selected from the group consisting of water, aqueous buffer, aqueous base, and mixtures thereof.

44. The process of claim 2 in which said reagent is selected from the group consisting of a diepoxide, dihalide, halo-epoxide, 2,4,6-trichloro-S-triazine, carbodiimide, 2-fluoro-1-methylpyridinium p-toluenesulfonate, disulfonyl chlorides, cyanogen bromide, diacid chlorides, chloroacetic acid, dialdehydes, and diisocyanates.

45. The process of claim 7 in which said membrane is further characterized as having submicron to micron-sized pores.

46. The process of claim 7 in which said membrane is a flat sheet.

47. The process of claim 7 in which said membrane is comprised of a blend or mixture of hydrophobic polymers.

48. The process of claim 7 in which said membrane is comprised of a blend or mixture of a hydrophobic polymer and a hydrophilic polymer.

49. The process of claim 2 in which said hydrophobic polymer is comprised substantially of polyethersulfone; said first nonsolubilizing solvent is aqueous base; said linker moiety is ethyleneglycol diglycidyl ether; said second nonsolubilizing solvent is aqueous base; said macromolecule is a hydroxyalkylcellulose; said third nonsolubilizing solvent is acetonitrile; said reagent is 2-fluoro-1-methylpyridinium p-toluenesulfonate; said fourth nonsolubilizing solvent is aqueous buffer; and said ligand is selected from the group consisting of natural Protein A, recombinant Protein A, Avidin, Biotin, Heparin, anti-Factor VIII, and anti-Factor IX.

50. The process of claim 13 wherein said manufactured article is a membrane.

51. The process of claim 13 wherein said manufactured article is a chromatographic packing material.

52. The process of claim 13 wherein said manufactured article is an artificial organ.

53. The process of claim 13 wherein said manufactured article is a prosthetic device.

54. The process of claim 1 or 2 in which said hydrophobic polymer is a manufactured article produced by a method selected from a group consisting of blowing, calendaring, coating, lamination and extrusion.

55. The process of claim 1 or 2 in which said hydrophobic polymer is a manufactured article produced by casting.

56. The process of claim 1 or 2 in which said hydrophobic polymer is a manufactured article produced by forming.

57. The process of claims 1 or 2 wherein said hydrophobic polymer is a copolymer.

58. The process of claims 1 or 2 wherein said hydrophobic polymer is a polymer blend.

59. The process of claim 1 or 2 in which said macromolecule is selected from the group consisting of a carbohydrate, liposome, protein, oligonucleotide, synthetic dye, natural dye, and derivatives and mixtures thereof.

60. The process of claim 59 wherein said carbohydrate is a polysaccharide.

61. The process of claim 59 wherein said protein is a glycoprotein.

62. The process of claim 1 or 2 in which said macromolecule is a biologically active species selected from the group consisting of enzyme and enzyme substrate.

63. The process of claim 1 or 2 in which said macromolecule is a biologically active species selected from the group consisting of hormone, immunoglobulin, histone and plasmid.

64. The process of claim 1 or 2 in which said macromolecule is a biologically active carrier protein.

65. The process of claim 2 in which said ligand is a surfactant.

66. The process of claim 2 in which said ligand is selected from the group consisting of enzyme and enzyme substrate.

67. The process of claim 2 in which said ligand is selected from the group consisting of hormone, immunoglobulin, histone and plasmid.

68. The process of claim 2 in which said ligand is a carrier protein.

69. The process of claim 37 in which said carbohydrate is a polysaccharide.

70. The process of claim 37 in which said protein is a lectin.

71. The process of claim 37 in which said ligand is a polynucleotide.

72. The process of claim 59 in which said protein is a lectin.

73. The process of claim 59 in which said macromolecule is a polynucleotide.

74. The process of claim 2 in which said ligand is a polypeptide.

75. A membrane comprised of a hydrophobic polymer whose surface has been modified according to the process of claim 1.

76. A membrane comprised of a hydrophobic polymer whose surface has been modified according to the process of claim 2.

* * * * *